US012370820B2

(12) United States Patent
Kojima et al.

(10) Patent No.: US 12,370,820 B2
(45) Date of Patent: Jul. 29, 2025

(54) LIQUID EJECTING DEVICE

(71) Applicant: SEIKO EPSON CORPORATION, Tokyo (JP)

(72) Inventors: Kenji Kojima, Fujimi-machi (JP); Tomonori Amari, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/190,584

(22) Filed: Mar. 27, 2023

(65) Prior Publication Data

US 2023/0302832 A1 Sep. 28, 2023

(30) Foreign Application Priority Data

Mar. 28, 2022 (JP) ................................ 2022-051314

(51) Int. Cl.

*B41J 29/17* (2006.01)
*B41J 2/165* (2006.01)
*B41J 11/00* (2006.01)

(52) U.S. Cl.

CPC ........... *B41J 29/17* (2013.01); *B41J 2/16552* (2013.01); *B41J 11/007* (2013.01); *B41J 2002/16558* (2013.01)

(58) Field of Classification Search

CPC ...... B41J 29/17; B41J 2/16552; B41J 11/007; B41J 2002/16558; B41J 11/42; B41J 15/048

See application file for complete search history.

(56) References Cited

U.S. PATENT DOCUMENTS 11,207,906 B2 12/2021 Satake et al.

FOREIGN PATENT DOCUMENTS

| | | |
|---|---|---|
| EP | 2923849 | 9/2015 |
| EP | 3403833 | 5/2018 |
| JP | 2016-182802 A | 10/2016 |

*Primary Examiner* — Jannelle M Lebron

(74) *Attorney, Agent, or Firm* — WORKMAN NYDEGGER

(57) ABSTRACT

A liquid ejecting device includes a transporting belt that has a support surface capable of supporting a medium and that can transport the medium in a first direction, an ejecting unit that can eject a liquid onto a first surface of the medium transported by the transporting belt, a regulating unit that comes into contact with the first surface of the medium ejected with the liquid by the ejecting unit and that regulates upward movement of the medium, and a cleaning unit that cleans the regulating unit.

6 Claims, 15 Drawing Sheets

LIQUID EJECTING DEVICE

The present application is based on, and claims priority from JP Application Serial Number 2022-051314, filed Mar. 28, 2022, the disclosure of which is hereby incorporated by reference herein in its entirety.

BACKGROUND

1. Technical Field

The present disclosure relates to a liquid ejecting device.

2. Related Art

Printing apparatuses that performs printing by applying ink on a recording medium are known. A printing apparatus described in JP-A-2016-182802 includes an endless belt that transports a recording medium. The endless belt transports the recording medium in a transport direction. The printing apparatus performs printing on the recording medium by ejecting ink onto the recording medium on the endless belt. The printing apparatus includes a plurality of tensioners that sandwich the endless belt and the recording medium therebetween. Of the plurality of tensioners, one of the tensioners comes into contact with a printed surface.

When a member such as a tensioner comes into contact with the printed surface, image quality of a printed image may deteriorate due to the ink or the like adhering to the member.

SUMMARY

A liquid ejecting device according to the present disclosure includes a transporting belt configured to transport a medium in a first direction, and having a support surface configured to support the medium, an ejecting unit configured to eject a liquid onto a first surface of the medium transported by the transporting belt, a regulating unit configured to come into contact with the first surface of the medium ejected with the liquid by the ejecting unit, and to regulate upward movement of the medium, and a cleaning unit configured to clean the regulating unit.

DESCRIPTION OF EXEMPLARY EMBODIMENTS

Figure 1:
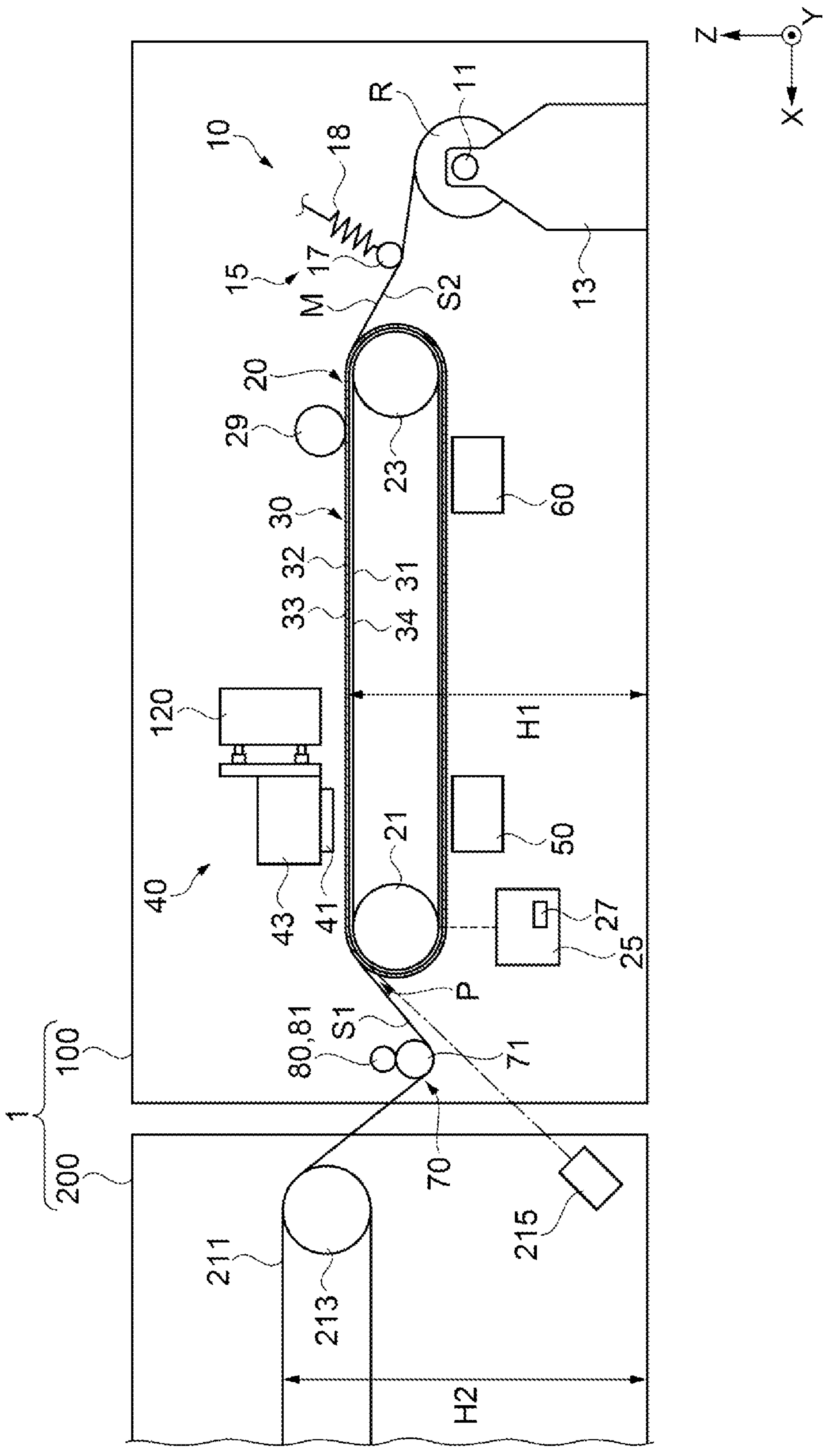
FIG. 1 is a diagram illustrating a schematic configuration of a printing system.

FIG. 1 illustrates a schematic configuration of a printing system 1. The printing system 1 includes a printer 100 and a drying device 200. FIG. 1 illustrates a partial configuration of the drying device 200. The printer 100 performs printing on a printing medium M by ejecting ink. The drying device 200 dries the printing medium M printed by the printer 100. The printer 100 and the drying device 200 are configured as separate bodies. The printer 100 corresponds to an example of a liquid ejecting device. The printing medium M corresponds to an example of a medium.

A plurality of drawings including FIG. 1 are illustrated using an XYZ coordinate system. An X-axis, a Y-axis, and a Z-axis are orthogonal to one another. The Z-axis is an axis perpendicular to an installation surface (not illustrated) of the printer 100. The X-axis and the Y-axis are parallel to the installation surface. The X-axis is an axis along a direction in which a medium transporting belt 30 transports the printing medium M on a surface facing a printing unit 40. The medium transporting belt 30 and the printing unit 40 will be described later. The Y-axis is an axis orthogonal to the direction in which the medium transporting belt 30 transports the printing medium M on the surface facing the printing unit 40. A direction directed upward from the installation surface along the Z-axis is indicated as a +Z direction. A direction directed downward from the installation surface along the Z-axis is indicated as a −Z direction. The direction in which the medium transporting belt 30 transports the printing medium M is indicated as a +X direction. A direction opposite to the direction in which the medium transporting belt 30 transports the printing medium M is indicated as a −X direction. A direction directed from the rear to the front of the printer 100 illustrated in FIG. 1 is indicated as a +Y direction. A direction directed from the front to the rear of the printer 100 illustrated in FIG. 1 is indicated as a −Y direction. Note that the +X direction is an example of a first direction.

The printer 100 is an inkjet printer that performs printing by ejecting ink onto the printing medium M. The printer 100 illustrated in FIG. 1 includes a supplying unit 10, a transporting unit 20, the printing unit 40, a cleansing unit 50, and a drying unit 60. The ink corresponds to an example of a liquid.

The supply unit 10 holds a roll body R. The roll body R is a roll around which the printing medium M is wound. The supply unit 10 supplies the printing medium M wound around the roll body R to the transporting unit 20. The supply unit 10 includes a feeding shaft 11, a shaft support member 13, and a tension adjustment mechanism 15.

The feeding shaft 11 rotatably supports the roll body R. The feeding shaft 11 is rotated in a predetermined direction by a feeding shaft driving mechanism described later. The feeding shaft 11 rotates in the predetermined direction to feed the printing medium M wound around the roll body R to the transporting unit 20. The feeding shaft 11 may support the roll body R via a roll core.

The shaft support member 13 rotatably supports the feeding shaft 11. The shaft support member 13 supports both end portions of the feeding shaft 11. The shaft support member 13 detachably supports the feeding shaft 11. By configuring the feeding shaft 11 to be detachable, a user can supply the roll body R to the feeding shaft 11.

The tension adjustment mechanism 15 adjusts the tension of the printing medium M fed from the roll body R. The tension adjustment mechanism 15 adjusts the transport speed and the like of the printing medium M, by adjusting the tension of the printing medium M. The tension adjustment mechanism 15 includes a contact member 17 and a tension spring 18.

The contact member 17 comes into contact with the printing medium M between the roll body R supported by the feeding shaft 11 and the transporting unit 20. The contact member 17 presses the printing medium M using a spring force of the tension spring 18. The contact member 17 is constituted by a cylindrical rod, a roller, or the like. The contact member 17 may be rotated by the movement of the printing medium M.

The tension spring 18 presses the printing medium M via the contact member 17. The tension spring 18 is attached to the contact member 17. The tension spring 18 expands and contracts in accordance with the tension of the printing medium M. When the tension of the printing medium M is larger than a predetermined tension, the tension spring 18 contracts. When the tension of the printing medium M is smaller than the predetermined tension, the tension spring 18 expands. The tension of the printing medium M is adjusted by the expansion and contraction of the tension spring 18.

The transporting unit 20 transports the printing medium M supplied by the supply unit 10, to a position facing the printing unit 40. The transporting unit 20 is provided at a position in the +X direction of the supply unit 10. The transporting unit 20 includes a driving roller 21, a driven roller 23, a belt driving mechanism 25, a pressing roller 29, and the medium transporting belt 30.

The driving roller 21 rotationally moves the medium transporting belt 30. The driving roller 21 is configured to be rotatable. The medium transporting belt 30 is wound over the driving roller 21. The driving roller 21 is rotated by a driving force from the belt driving mechanism 25. The driving roller 21 is coupled to the belt driving mechanism 25.

The medium transporting belt 30 is wound over the driven roller 23. The driven roller 23 is rotatably supported. The driven roller 23 is rotated by the rotational movement of the medium transporting belt 30. The medium transporting belt 30 is stretched by the driven roller 23 and the driving roller 21. The driven roller 23 or the driving roller 21 applies a tension to the medium transporting belt 30 by a tension application mechanism (not illustrated).

The belt driving mechanism 25 generates a driving force for rotationally moving the medium transporting belt 30. The belt driving mechanism 25 includes a driving source such as a motor, and a drive transmission mechanism. The driving source and the drive transmission mechanism are not illustrated in the drawings. The driving force generated by the driving source is transmitted to the driving roller 21 via the drive transmission mechanism. The driving roller 21 is rotated by the transmitted driving force. The medium transporting belt 30 is moved to rotate by the rotation of the driving roller 21.

The belt driving mechanism 25 includes an encoder 27. The encoder 27 detects the rotation amount, the rotation speed, or the like of the motor used as the driving source, or of the driving roller 21. The belt driving mechanism 25 is controlled based on the rotation amount, the rotation speed, or the like detected by the encoder 27.

The pressing roller 29 presses the printing medium M against the medium transporting belt 30. The pressing roller 29 is provided at a position in the +Z direction of the medium transporting belt 30. The pressing roller 29 presses the printing medium M transported from the supply unit 10 to the medium transporting belt 30, onto the medium transporting belt 30. The pressing roller 29 may be constituted by a rod or the like. The pressing roller 29 may reciprocate along the medium transporting belt 30 over a predetermined distance to press the printing medium M against the medium transporting belt 30.

The medium transporting belt 30 transports the printing medium M. The medium transporting belt 30 can transport the printing medium M in the +X direction. The medium transporting belt 30 is provided in an endless manner. The medium transporting belt 30 transports the printing medium M having a printing surface S1 in the +X direction. The medium transporting belt 30 supports a back surface S2 of the printing medium M. The back surface S2 of the printing medium M is a surface opposite to the printing surface S1. The medium transporting belt 30 includes a substrate 31 and an adhesive layer 32. The medium transporting belt 30 corresponds to an example of a transporting belt.

The substrate 31 is provided in an endless manner. The substrate 31 has a substrate front surface 33 and a substrate back surface 34, which is a surface opposite to the substrate front surface 33. The substrate front surface 33 is a surface that forms the outer circumferential surface of the substrate 31 when the medium transporting belt 30 is stretched by the driving roller 21 and the driven roller 23. The substrate back surface 34 is a surface that forms the inner circumferential surface of the substrate 31 when the medium transporting belt 30 is stretched by the driving roller 21 and the driven roller 23. The substrate back surface 34 comes into contact with the driving roller 21 and the driven roller 23.

The adhesive layer 32 supports the printing medium M on the medium transporting belt 30 by adhering to the back surface S2 of the printing medium M. The adhesive layer 32 is provided on the substrate front surface 33. The adhesive layer 32 has adhesiveness. The adhesive layer 32 contains an adhesive having adhesiveness. The adhesive is, for example, a hot-melt adhesive containing thermoplastic elastomer SIS as a main component. SIS is an abbreviation of styrene-isoprene block copolymer. Examples of the adhesive include "Polixresin", "Newdine", and "Aquadine" series manufactured by Yokohama Polymer Co., Ltd., "MC Polymer Series" manufactured by Murayama Chemical Laboratory Co., Ltd., "Unikensol RV-30 (for screen printing)" manufactured by Union Chemical Industry Co., Ltd., "Plaster EH" manufactured by Shin-Nakamura Chemical Co., Ltd., and "ATRASOL GP1 ((ATR code: ATR1717)" manufactured by ATR Chemicals. The adhesive layer 32 is formed by applying the adhesive onto the substrate front surface 33. The adhesive layer 32 is formed over the entire circumference of the substrate front surface 33. The adhesive force of the adhesive layer 32 decreases in accordance with usage conditions of the printer 100, the passage of time, and the like. The adhesive layer 32 corresponds to an example of a support surface capable of supporting the printing medium M.

The adhesive layer 32 is pressed against the printing medium M supplied from the supply unit 10 by the pressing roller 29. As a result of being pressed against the printing medium M by the pressing roller 29, the adhesive layer 32 adheres to the back surface S2 of the printing medium M. The medium transporting belt 30 transports the printing medium M adhered to the adhesive layer 32 in the +X direction. The medium transporting belt 30 transports the printing surface S1 of the printing medium M adhered to the adhesive layer 32, to the position facing the printing unit 40.

The printing unit 40 performs the printing on the printing surface S1 of the printing medium M. The printing unit 40 performs the printing based on print data received from an external device or the like. The printing unit 40 can eject the ink onto the printing surface S1 of the printing medium M. The printing unit 40 performs the printing by ejecting the ink onto the printing surface S1 of the printing medium M transported by the medium transporting belt 30. The printing unit 40 ejects the ink based on the print data. The printing unit 40 corresponds to an example of an ejecting unit. The printing surface S1 of the printing medium M corresponds to an example of a first surface of a medium. The printing unit 40 includes a printing head 41 and a carriage 43. The printing unit 40 is supported by a support frame 120.

The printing head 41 ejects the ink onto the printing medium M. The printing head 41 performs the printing by ejecting the ink onto the printing medium M. The printing head 41 is an inkjet head. The printing head 41 ejects one or more types of the ink. The printing head 41 is controlled by a printing control portion 135 described later.

The carriage 43 supports the printing head 41, and moves the printing head 41 along the Y-axis. The carriage 43 moves in the +Y direction and the −Y direction along the Y-axis. The carriage 43 moves the printing head 41 in the +Y direction and the −Y direction along the Y-axis. When the carriage 43 is moving in the +Y direction or the −Y direction, the printing head 41 ejects the ink onto the printing medium M. The carriage 43 is driven by a printing unit driving mechanism 123 described later.

The support frame 120 supports the carriage 43 so that the carriage 43 is movable along the Y-axis. The support frame 120 may be constituted by a portion of a main body frame of the printer 100. The support frame 120 may be constituted by a member supported by the main body frame.

The printing unit 40 illustrated in FIG. 1 includes the carriage 43, but is not limited to this configuration. The printing unit 14 need not necessarily include the carriage 43. As an example, when the printing head 41 is a line inkjet head including a nozzle row having a width equal to or greater than the width of the printing medium M along the Y-axis, the carriage 43 need not necessarily be used.

The cleansing unit 50 cleanses the adhesive layer 32. The cleansing unit 50 is provided at a position in the −Z direction of the transporting unit 20. The cleansing unit 50 faces the medium transporting belt 30 moving in the −X direction, at a position in the −Z direction of the medium transporting belt 30. The cleansing unit 50 cleanses the medium transporting belt 30 from which the printing medium M printed by the printing unit 40 has been peeled off. The cleansing unit 50 includes a cleansing brush and a storage portion. The cleansing brush and the storage portion are not illustrated in the drawings.

The cleansing brush comes into contact with the adhesive layer 32, and cleanses the adhesive layer 32. The cleansing brush comes into contact with the medium transporting belt 30 from below the medium transporting belt 30. The cleansing brush cleanses the adhesive layer 32 by coming into contact with the medium transporting belt 30 when the medium transporting belt 30 is rotationally moving. The cleansing brush removes the ink or the like adhering to the adhesive layer 32.

The storage portion stores a cleansing liquid. The cleansing liquid is water, a water-soluble solvent such as an alcohol aqueous solution, or the like. The cleansing liquid may contain a surfactant, an anti-foaming agent, or the like. The cleansing brush supplies the cleansing liquid stored in the storage portion to the adhesive layer 32, and cleanses the adhesive layer 32. By using the cleansing liquid, the cleansing brush can more easily remove the ink adhering to the adhesive layer 32.

The drying unit 60 dries the adhesive layer 32 to which the cleansing liquid has been applied. The drying unit 60 is provided at a position in the −Z direction of the transporting unit 20. The drying unit 60 is provided at a position in the −X direction of the cleansing unit 50. The drying unit 60 faces the medium transporting belt 30 cleansed by the cleansing unit 50. As an example, the drying unit 60 includes a hot air blower that blows hot air against the medium transporting belt 30. The hot air blower is not illustrated in the drawings. The hot air blower dries the adhesive layer 32 by blowing the hot air from below the medium transporting belt 30. The hot air blower dries the adhesive layer 32 by blowing the hot air against the medium transporting belt 30 moving in the −X direction.

The regulating unit 70 regulates the position along the Z-axis of the printing medium M peeled off from the medium transporting belt 30. The regulating unit 70 comes into contact with the printing surface S1 of the printing medium M, and regulates the movement of the printing medium M in the +Z direction. The regulating unit 70 is provided at a position between the transporting unit 20 and the drying device 200. The printing medium M printed by the printing unit 40 moves from the transporting unit 20 to the drying device 200. After being peeled off from the medium transporting belt 30, the printing medium M moves to the drying device 200. The regulating unit 70 regulates the movement in the +Z direction of the printing medium M peeled off from the medium transporting belt 30. The regulating unit 70 includes a regulating member 71 and a cleaning unit 80.

The regulating member 71 regulates the movement of the printing medium M in the +Z direction by coming into contact with the printing surface S1 of the printing medium M. When the regulating member 71 comes into contact with the printing surface S1, the regulating member 71 applies its own weight onto the printing medium M. The regulating member 71 regulates the movement of the printing medium M in the +Z direction by applying its own weight onto the printing medium M. The regulating member 71 may apply a load of a weight 110 described later onto the printing medium M. When the regulating member 71 is a roller member, the regulating member 71 is rotated by the movement of the printing medium M. The regulating member 71 may not come into contact with the printing medium M depending on a position at which the printing medium M is peeled off from the medium transporting belt 30. Due to the adhesive force of the adhesive layer 32, a peel-off position P at which the printing medium M is peeled off from the medium transporting belt 30 changes in the +Z direction or the −Z direction. When the peel-off position P is shifted further in the −Z direction than a predetermined position, the regulating member 71 does not come into contact with the printing medium M. The regulating member 71 corresponds to an example of a regulating unit.

The cleaning unit 80 cleans the regulating member 71. The cleaning unit 80 corresponds to an example of a cleaning unit. When the regulating member 71 comes into contact with the printing surface S1 of the printing medium M, the ink on the printing surface S1 may adhere to the regulating member 71. When the ink adhering to the regulating member 71 re-adheres to the printing medium M, image quality of an image printed on the printing surface S1 of the printing medium M deteriorates. The cleaning unit 80 removes the ink adhering to the regulating member 71. By the cleaning unit 80 removing the ink adhering to the regulating member 71, the ink adhering to the regulating member 71 is less likely to re-adhere to the printing surface S1 of the printing medium M. The image quality of the image printed on the printing surface S1 of the printing medium M is less likely to deteriorate. The cleaning unit 80 illustrated in FIG. 1 includes a cleaning roller 81. The cleaning roller 81 corresponds to an example of a cleaning member.

The cleaning roller 81 cleans the regulating member 71. The cleaning roller 81 comes into contact with the regulating member 71. The cleaning roller 81 removes the ink adhering to the regulating member 71. The cleaning roller 81 may be rotated by a regulating unit driving mechanism 125 described later. The outer circumferential surface of the cleaning roller 81 is constituted by cloth, sponge, or the like. The cleaning roller 81 may hold a cleaning liquid. In addition, a configuration may be adopted in which the type of the cleaning roller 81 can be replaced with an optimum type, by the user, depending on the type of ink.

The drying device 200 dries the printing medium M printed by the printing unit 40. The drying device 200 receives the printing medium M printed by the printer 100, and transports the printing medium M to the interior thereof. The drying device 200 includes a drying belt 211, a transporting roller 213, a drying unit (not illustrated), and a medium sensor 215. The drying device 200 is constituted by a housing different from that of the printer 100.

The printing medium M fed out from the printer 100 is placed on the drying belt 211. The drying belt 211 receives the printing medium M fed out from the printer 100. The drying belt 211 transports the received printing medium M to the drying unit. The drying belt 211 is moved to rotate by a drying belt driving mechanism 221 described later.

The drying belt 211 is wound over the transporting roller 213. The drying belt 211 is stretched by the transporting roller 213 and a stretching roller (not illustrated). The drying belt 211 may be stretched by the transporting roller 213 and two or more of the stretching rollers. The transporting roller 213 is provided at a position facing the printer 100. Either the transporting roller 213 or the stretching roller is rotationally driven by the drying belt driving mechanism 221. By the transporting roller 213 or the stretching roller being rotationally driven, the drying belt 211 is moved to rotate.

The drying unit dries the printing medium M printed by the printing unit 40. The drying unit is constituted by an infrared heater, a hot air blowing device, an induction heater, or the like. The drying unit dries the printing medium M by heating the printing medium M transported by the drying belt 211. The drying unit is disposed at a position in the −Z direction or at a position in the +X direction of the drying belt 211 illustrated in FIG. 1.

The medium sensor 215 detects the peel-off position P at which the printing medium M is peeled off from the medium transporting belt 30, or a position of the printing medium M. The position of the printing medium M is a movement position of the printing medium M between the transporting unit 20 and the drying device 200. The drying device 200 controls the medium transport speed by the drying belt 211, based on a detection result of the medium sensor 215. For example, when the peel-off position P is changed to a position further in the +Z direction than the predetermined position, the movement distance of the printing medium M between the transporting unit 20 and the drying device 200 becomes shorter than a predetermined distance. In this case, the drying device 200 causes the medium transport speed by the drying belt 211 to be slower than a predetermined speed. The drying device 200 performs control such that a movement time period of the printing medium M moving between the transporting unit 20 and the drying device 200 falls within a predetermined range.

In FIG. 1, a height along the Z-axis at which the medium transporting belt 30 of the printer 100 supports the printing medium M is indicated as a first height H1. In FIG. 1, a height along the Z-axis at which the printing medium M is placed on the drying belt 211 of the drying device 200 is indicated as a second height H2. The second height H2 may be higher than the first height H1. When the regulating unit 70 is not provided, there is a possibility that the printing medium M is peeled off from the adhesive layer 32 of the medium transporting belt 30 at the surface of the medium transporting belt 30 facing the printing unit 40. If the printing medium M is peeled off at the surface of the medium transporting belt 30 facing the printing unit 40, the printing medium M comes into contact with the printing head 41. The regulating unit 70 can prevent the printing medium M from coming into contact with the printing head 41.

The printer 100 includes the medium transporting belt 30 that includes the adhesive layer 32 capable of supporting the printing medium M and that can transport the printing medium M in the +X direction, the printing unit 40 that can eject the ink onto the printing surface S1 of the printing medium M transported by the medium transporting belt 30, the regulating member 71 that comes into contact with the printing surface S1 of the printing medium M ejected with the ink by the printing unit 40 and that regulates the movement of the printing medium M in the +Z direction, and the cleaning unit 80 that cleans the regulating member 71.

It is possible to reduce the possibility that the image quality of the image printed on the printing medium M deteriorates as a result of the ink adhering to the regulating member 71 re-adhering to the printing medium M.

FIGS. 2, 3, 4, 5, and 6 illustrate a support structure of the regulating member 71. FIGS. 2, 3, 4, 5, and 6 illustrate a regulating roller 73 as an example of the regulating member 71. The regulating roller 73 is supported by a regulating member support portion 91.

Figure 2:
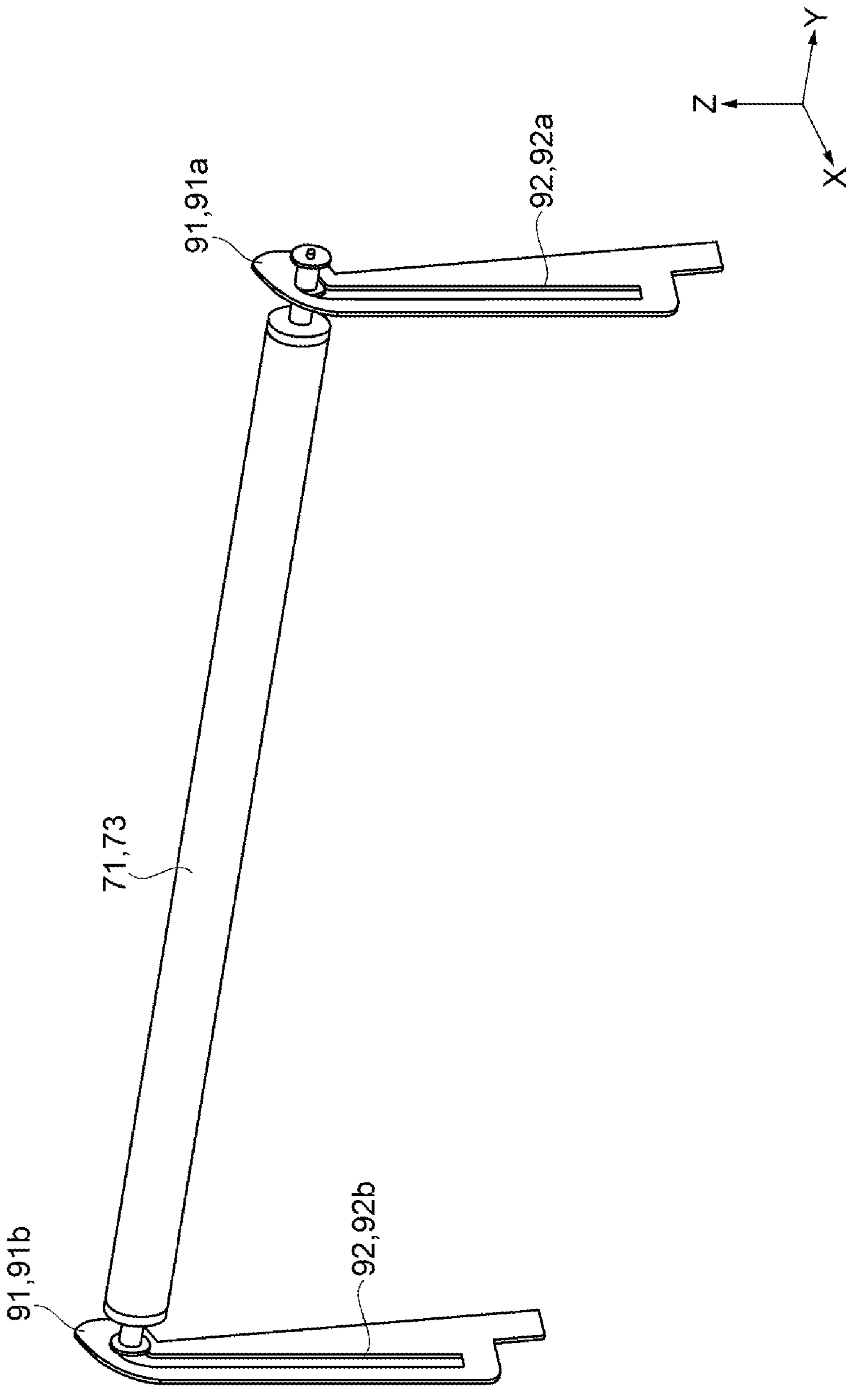
FIG. 2 is a diagram illustrating a regulating roller supported by a regulating member support portion.

FIG. 2 illustrates the regulating roller 73 supported by the regulating member support portion 91. The regulating roller 73 is a roller member. The regulating member support portion 91 includes a first support member 91*a* and a second support member 91*b*. The first support member 91*a* is disposed at a position in the +Y direction of the printer 100. The second support member 91*b* is disposed at a position in the −Y direction of the printer 100. The first support member 91*a* includes a first guide portion 92*a*. The second support member 91*b* includes a second guide portion 92*b*. The first guide portion 92*a* and the second guide portion 92*b* are guide portions 92 that guide movement of the regulating roller 73. The first support member 91*a* and the second support member 91*b* correspond to an example of a support member.

The regulating member support portion 91 supports the regulating member 71 in a replaceable manner. The regulating member 71 regulates the movement of the printing medium M along the Z-axis by its own weight. The user can change a load applied to the printing medium M by installing the regulating member 71 having a different mass at the regulating member support portion 91. As an example, the user replaces the regulating member 71 installed at the regulating member support portion 91 in accordance with the type of the printing medium M printed by the printer 100. The user can install the regulating member 71 corresponding to the type of the printing medium M.

Figure 3:
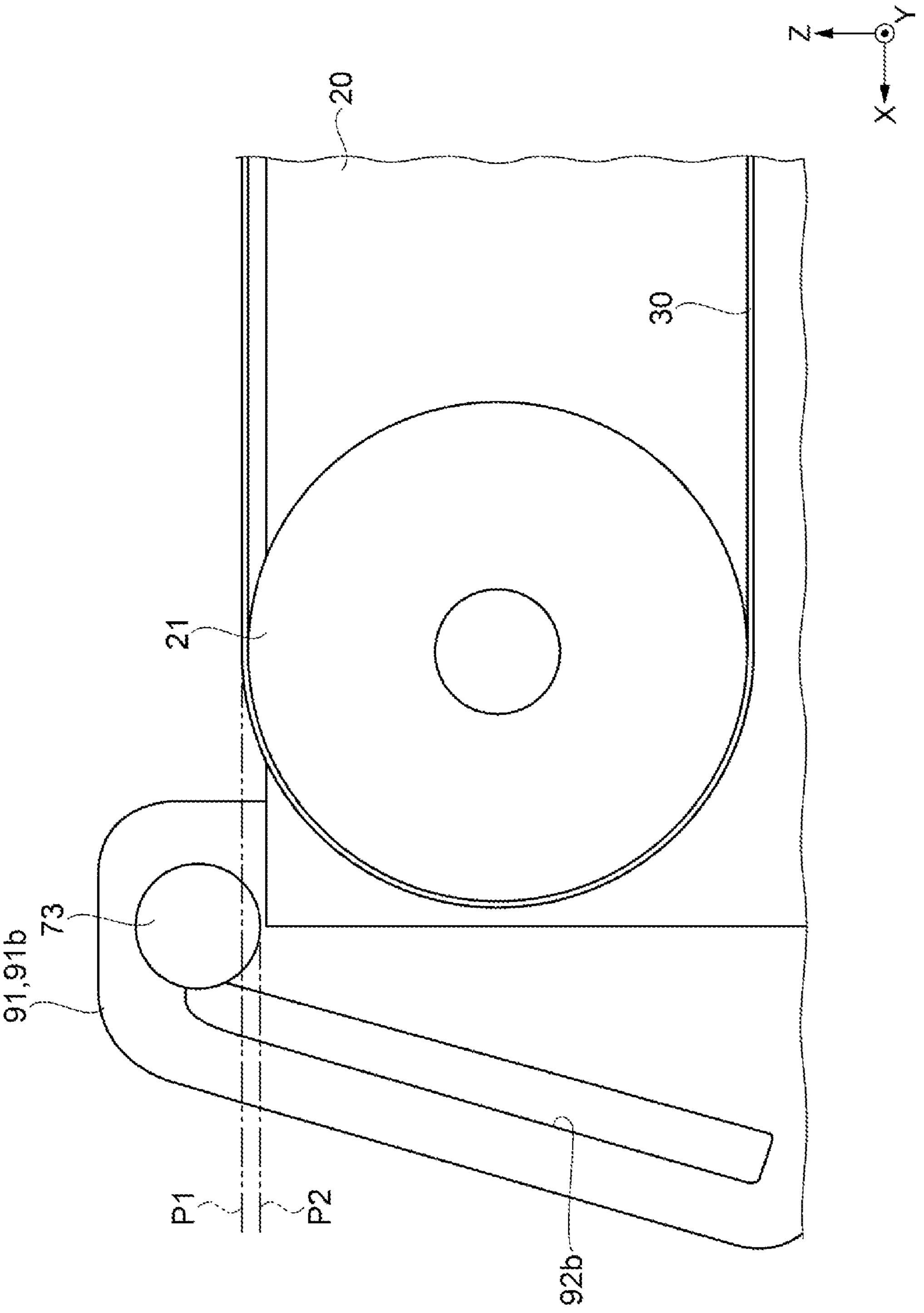
FIG. 3 is a diagram illustrating a relationship between a transporting unit and the regulating member support portion.

FIG. 3 illustrates a relationship between the transporting unit 20 and the regulating member support portion 91. FIG. 3 illustrates an X-Z cross section. FIG. 3 illustrates the transporting unit 20 and the regulating member support portion 91. The transporting unit 20 illustrated in FIG. 3 includes the driving roller 21 and the medium transporting belt 30. FIG. 3 illustrates the second support member 91*b* as the regulating member support portion 91. The second support member 91*b* supports the regulating roller 73, which is an example of the regulating member 71.

The regulating roller 73 is supported by the second support member 91*b* so as to be movable along the second guide portion 92*b*. The regulating roller 73 moves in the +Z direction or the −Z direction. The regulating roller 73 moves in the +Z direction or the −Z direction by the tension applied to the printing medium M and its own weight of the regulating roller 73. The regulating roller 73 moves in the +Z direction or the −Z direction at the medium transport speed of the drying device 200. As an example, when the drying device 200 transports the printing medium M at a speed faster than the transport speed of the printing medium M by the printer 100, the regulating roller 73 moves in the +Z direction. The regulating roller 73 may be moved to a predetermined position by operation of the user.

FIG. 3 illustrates a case where the regulating roller 73 is positioned at an upper limit position of the second guide portion 92*b*. FIG. 3 illustrates an uppermost surface position P1 of the medium transporting belt 30 and a lower end position P2 of the regulating roller 73. When the regulating roller 73 is positioned at the upper limit position of the second guide portion 92*b*, the lower end position P2 of the regulating roller 73 is below the uppermost surface position P1 of the medium transporting belt 30. Since the restriction roller 73 is restricted from moving above the upper limit position, the printing medium M on the medium transporting belt 30 does not move above the lower end position P2 of the restriction roller 73. The regulating roller 73 can prevent the printing medium M from being peeled off at the surface of the medium transporting belt 30 facing the printing unit 40.

Figure 4:
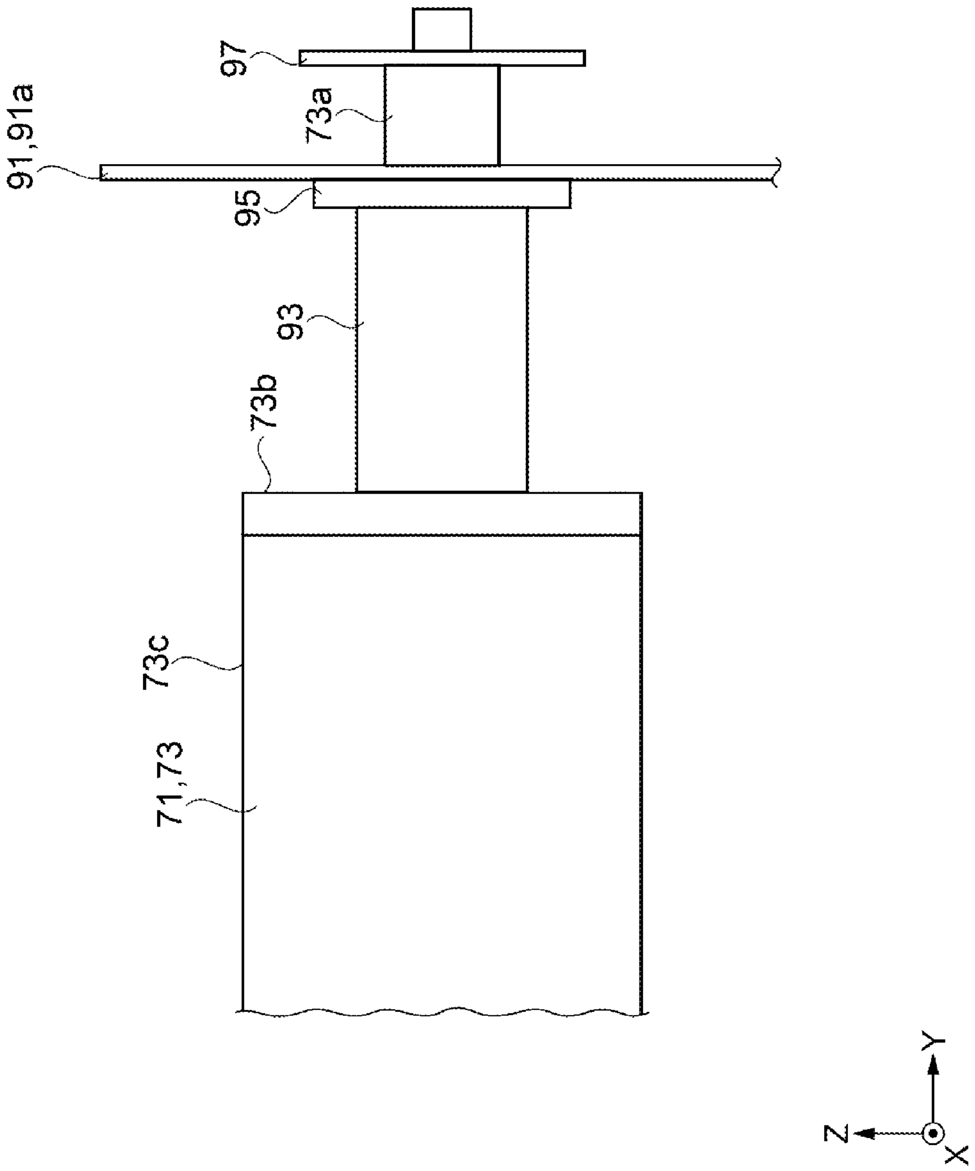
FIG. 4 is a diagram illustrating a support structure of a regulating member by the regulating member support portion.
Figure 5:
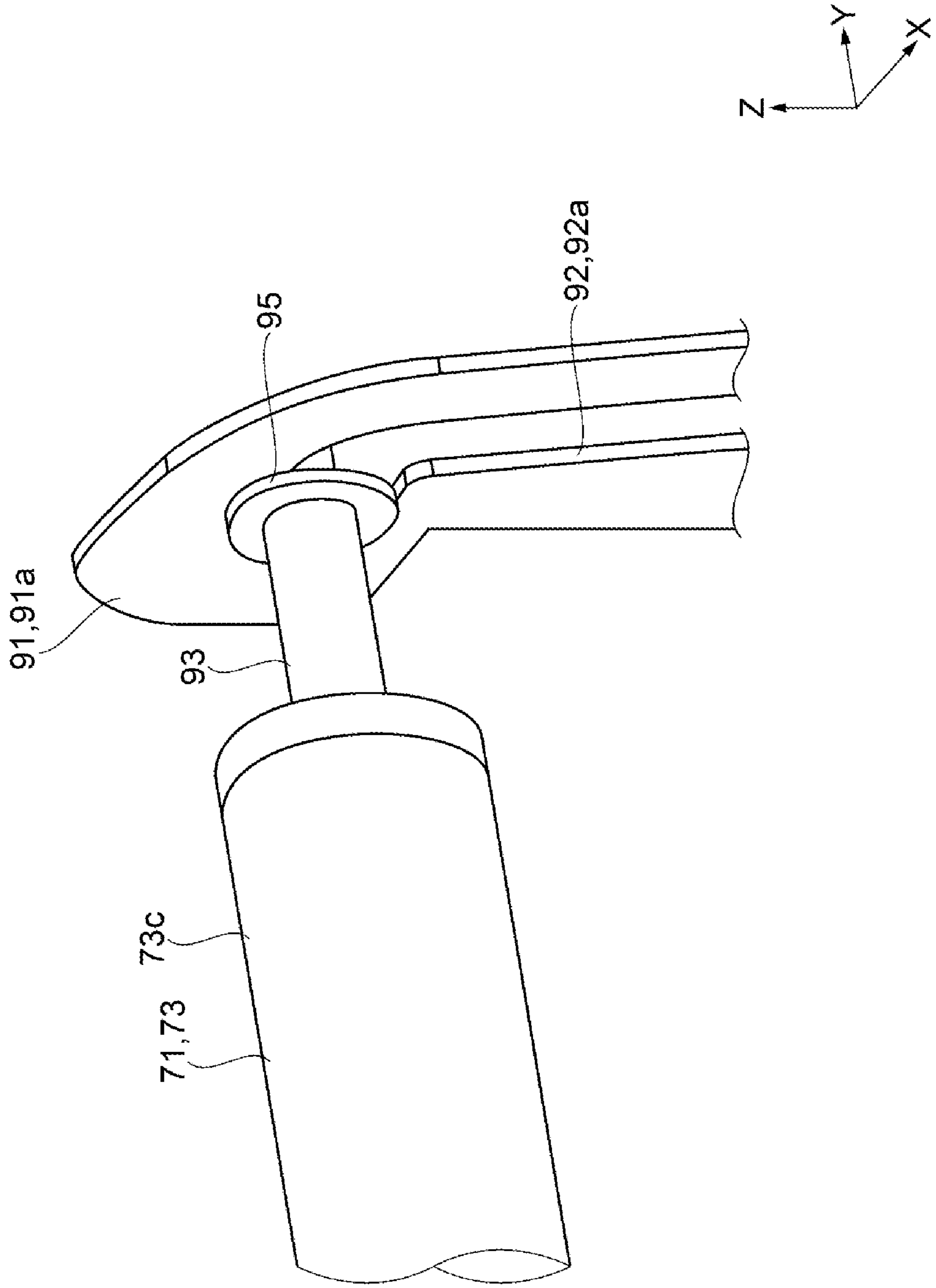
FIG. 5 is a diagram illustrating the support structure of the regulating member by the regulating member support portion.
Figure 6:
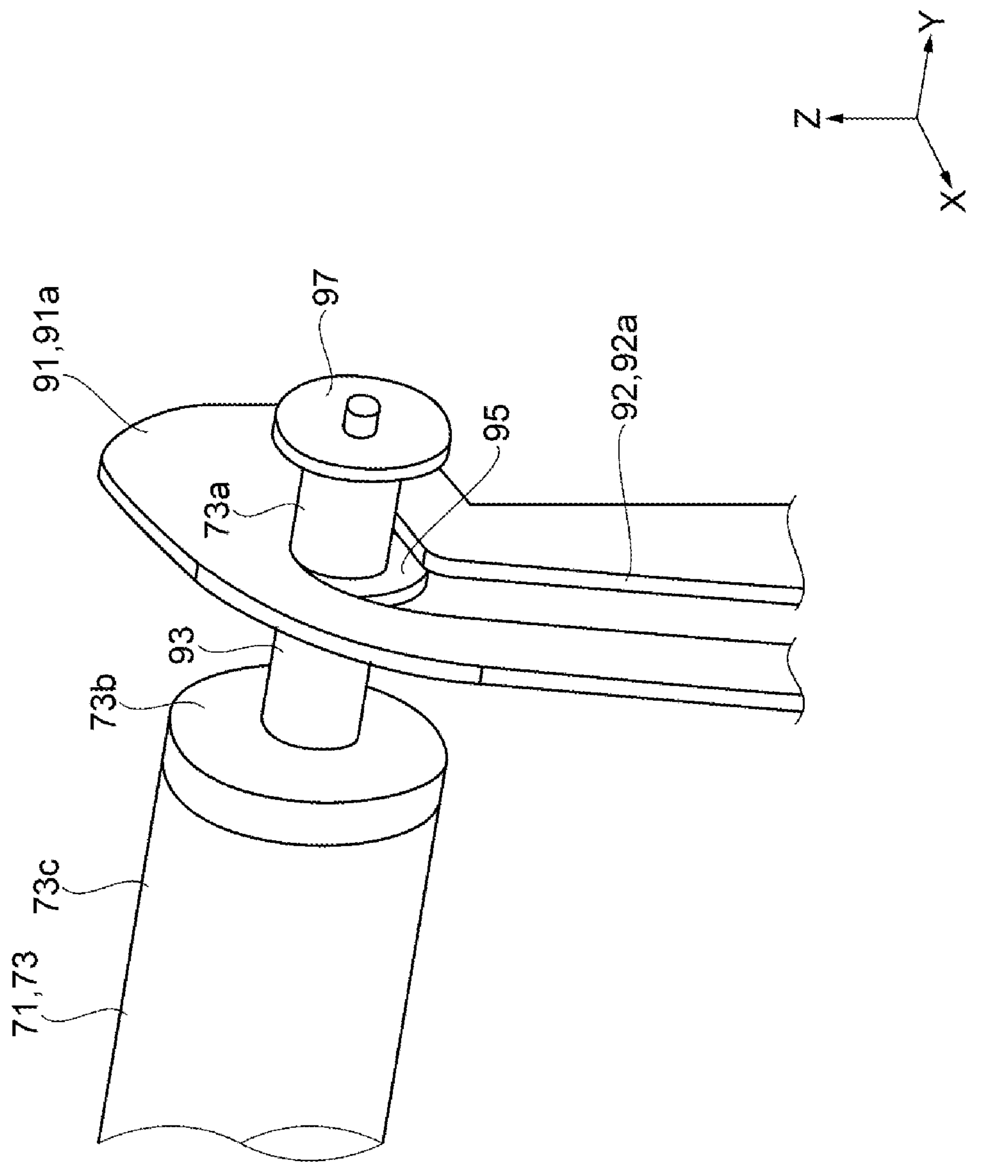
FIG. 6 is a diagram illustrating the support structure of the regulating member by the regulating member support portion.

FIGS. 4, 5, and 6 illustrate a support structure of the regulating member 71 by the regulating member support portion 91. FIGS. 4, 5, and 6 illustrate the regulating roller 73 as an example of the regulating member 71. FIGS. 4, 5, and 6 illustrate the first support member 91*a*, which is a part of the regulating member support portion 91. FIGS. 4, 5, and 6 illustrate the regulating roller 73, the first support member 91*a*, and a regulating spring 93.

FIG. 4 illustrates the support structure of the regulating member 71 by the regulating member support portion 91. FIG. 4 illustrates a front view in the +X direction. FIG. 4 illustrates the regulating roller 73, the first support member 91*a*, the regulating spring 93, a spring receiver 95, and a retaining member 97. Although FIG. 4 illustrates a support structure of the first support member 91*a*, which is a part of the regulating member support portion 91, a support structure of the second support member 91*b* may be the same as the configuration of the first support member 91*a* illustrated in FIG. 4.

The regulating roller 73, which is an example of the regulating member 71, includes a regulating roller shaft 73*a*. An end portion of the regulating roller shaft 73*a* is supported by the regulating member support portion 91. The end portion of the regulating roller shaft 73*a* corresponds to an example of a shaft end portion. FIG. 4 illustrates a configuration in which the regulating roller shaft 73*a* is supported by the first support member 91*a*. The regulating roller 73 is rotatably supported by the regulating member support portion 91. The regulating roller 73 is supported by the regulating member support portion 91 so as to be movable along the Y-axis. The Y-axis corresponds to an example of an axis intersecting the first direction and extending along the support surface. When the printing medium M moves in a skewed manner, the regulating roller 73 moves along the Y-axis following the skewed movement of the printing medium M. A shaft member (not illustrated), which regulates the movement of the regulating roller 73 along the Y-axis, may be provided. The rotation center of the regulating roller 73 substantially coincides with the geometric center of the shaft member. The shaft member supports the regulating roller 73 so that the regulating roller 73 is movable along the Y-axis. The regulating roller 73 can be rotated by the movement of the printing medium M, about the shaft member as the center of rotation. By the regulating roller 73 moving along the Y-axis following the movement of the printing medium M, it is possible to reduce rubbing of the printing surface S1 of the printing medium M by the regulating roller 73. The regulating roller 73 can reduce the deterioration in the image quality of the image printed on the printing surface S1.

The regulating member 71 is movable along the Y-axis intersecting the X-axis and extending along the adhesive layer 32.

The regulating member 71 can move along the Y-axis following the skewed movement of the printing medium M. The rubbing of the image caused by the skewed movement is unlikely to occur.

The regulating spring 93 presses the regulating roller 73 along the Y-axis. The regulating spring 93 is inserted into the regulating roller shaft 73*a*. The regulating spring 93 presses a regulating roller end surface 73*b* of the regulating roller 73 in the −Y direction along the Y-axis. The regulating roller end surface 73*b* is a surface that couples a regulating roller surface 73*c*, which comes into contact with the printing medium M, and the regulating roller shaft 73*a*. The regulating spring 93 presses the first support member 91*a* via the spring receiver 95. The regulating spring 93 is provided at a position facing the first support member 91*a*. The regulating spring 93 is provided at a position between the regulating roller end surface 73*b* and the spring receiver 95. When the regulating roller 73 moves in the +Y direction due to the skewed movement of the printing medium M, the regulating spring 93 presses the regulating roller 73 in the −Y direction. The regulating spring 93 presses the regulating roller 73 in the −Y direction to reduce an amount of movement of the regulating roller 73 when the regulating roller 73 moves in the +Y direction. The regulating spring 93 reduces the amount of movement when the printing medium M moves in a skewed manner. The restriction spring 93 corresponds to an example of an elastic member. Although FIG. 4 illustrates the regulating spring 93, the configuration is not limited to this example. Instead of the regulating spring 93, a member having an elastic function such as rubber may be provided.

The spring receiver 95 is pressed by the regulating spring 93. The spring receiver 95 is in contact with one end portion of the regulating spring 93. The spring receiver 95 is provided between the regulating spring 93 and the first support member 91*a*. The spring receiver 95 need not necessarily be provided. When the spring receiver 95 is not provided, the regulating spring 93 is in contact with the first support member 91*a* and presses the first support member 91*a*.

The retaining member 97 prevents the regulating roller shaft 73*a* from coming off from the first support member 91*a*. When the regulating roller 73 moves in the −Y direction, the retaining member 97 prevents the regulating roller 73 from coming off from the first support member 91*a*. Note that the retaining member 97 need not necessarily be provided. In this case, it is sufficient that the dimension of the regulating roller shaft 73*a* in the Y direction be adjusted to a dimension with which the regulating roller 73 does not come off from the first support member 91*a* when the regulating roller 73 moves in the −Y direction.

FIG. 5 illustrates the support structure of the regulating member 71 by the regulating member support portion 91. FIG. 5 illustrates a surface of the first support member 91*a* in the −Y direction. FIG. 5 illustrates the first guide portion 92*a* provided at the first support member 91*a*. Although FIG. 5 illustrates the support structure of the first support member 91*a*, which is a part of the regulating member support portion 91, the support structure of the second support member 91*b* may be the same as the configuration of the first support member 91*a* illustrated in FIG. 5.

The regulating roller 73, which is an example of the regulating member 71, is supported so as to be movable along the first guide portion 92*a*. The spring receiver 95 is supported by the regulating roller shaft 73*a* of the regulating roller 73. When the regulating roller 73 moves along the first guide portion 92*a*, the spring receiver 95 moves along the first guide portion 92*a* following the movement of the regulating roller 73. When moving along the first guide portion 92*a*, the spring receiver 95 comes into contact with the first support member 91*a* and receives the pressing force of the regulating spring 93.

FIG. 6 illustrates the support structure of the regulating member 71 by the regulating member support portion 91. FIG. 6 illustrates a surface of the first support member 91*a* in the +Y direction. FIG. 6 illustrates the first guide portion 92*a* provided at the first support member 91*a*. Although FIG. 6 illustrates the support structure of the first support member 91*a*, which is a part of the regulating member support portion 91, the support structure of the second support member 91*b* may be the same as the configuration of the first support member 91*a* illustrated in FIG. 6.

The regulating roller shaft 73*a* is fitted into the first guide portion 92*a*. The first guide portion 92*a* guides the regulating roller shaft 73*a*. The regulating roller shaft 73*a* moves in the +Z direction or the −Z direction along the first guide portion 92*a*.

The printer 100 includes the first support member 91*a* that supports the regulating roller shaft 73*a* of the regulating roller 73, and the regulating spring 93 that faces the first support member 91*a* and presses the regulating spring 73 along the Y-axis.

Since the regulation spring 93 presses the regulating roller 73, it is possible to reduce the movement of the regulating roller 73 along the Y-axis caused by the skewed movement of the printing medium M.

Figure 7:
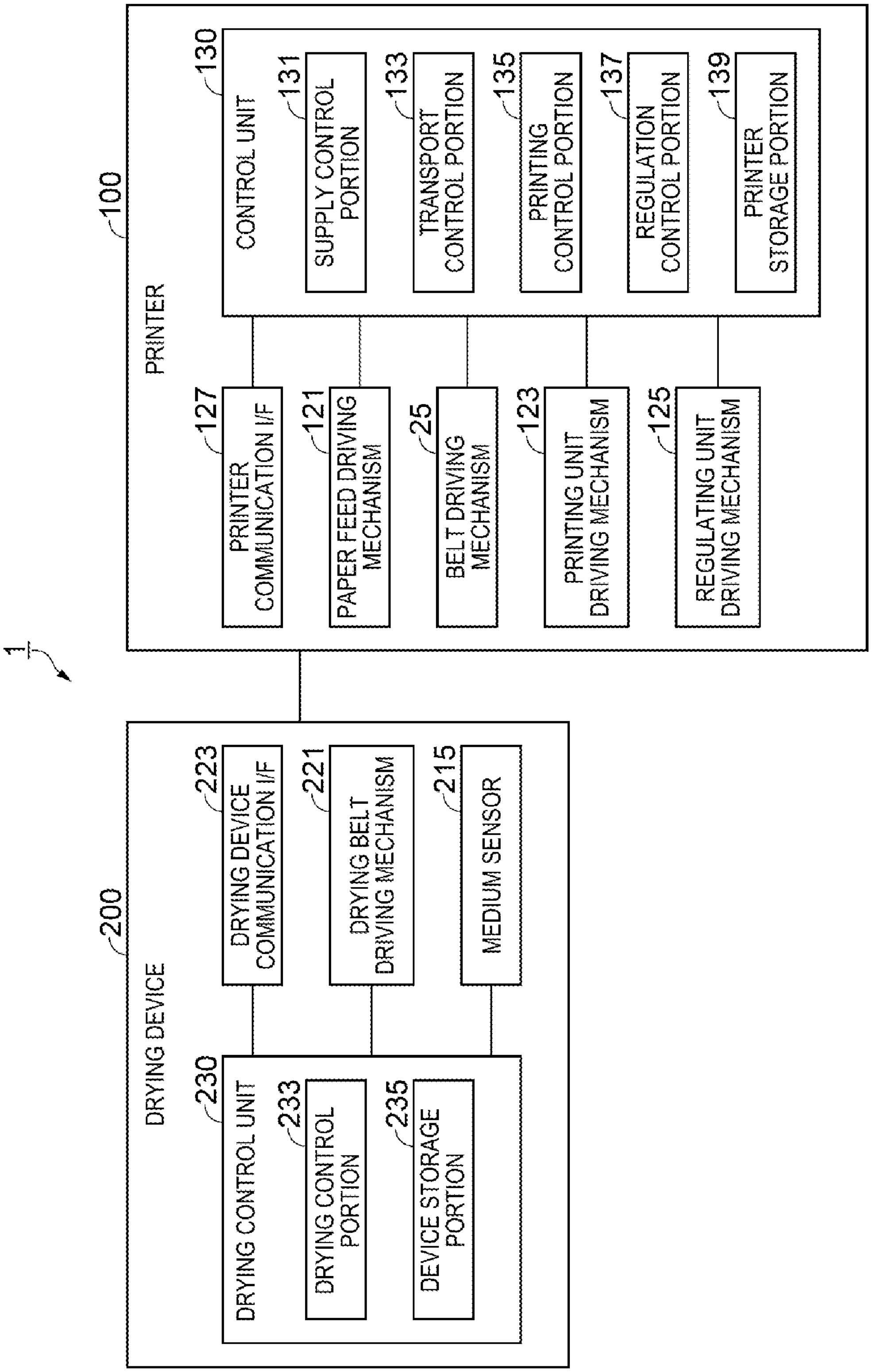
FIG. 7 is a block diagram illustrating the configuration of the printing system.

FIG. 7 is a block diagram illustrating a configuration of the printing system 1. FIG. 7 illustrates the printing system 1 that couples the printer 100 and the drying device 200 such that the printer 100 and the drying device 200 can communicate with each other. The printer 100 and the drying device 200 need not necessarily be communicatively coupled to each other. The printer 100 and the drying device 200 may be individually controlled by the user.

The printer 100 includes a paper feed driving mechanism 121, the belt driving mechanism 25, the printing unit driving mechanism 123, a regulating unit driving mechanism 125, a printer communication interface 127, and a control unit 130. In FIG. 7, interface is abbreviated as I/F. The printer 100 may include a cleansing unit driving mechanism that drives the cleansing unit 50. The cleansing unit driving mechanism and the like are not illustrated in the drawings.

The paper feed driving mechanism 121 drives the supply unit 10. The paper feed driving mechanism 121 includes a feeding shaft driving mechanism (not illustrated) and the tension adjustment mechanism 15. The paper feed driving mechanism 121 feeds the printing medium M to the transporting unit 20 based on a detection result of a tension detection mechanism (not illustrated). The tension detection mechanism detects the tension of the printing medium M between the roll body R and the transporting unit 20.

The feeding shaft driving mechanism rotates the feeding shaft 11 in a predetermined direction. The feeding shaft driving mechanism feeds the printing medium M from the roll body R by rotating the feeding shaft 11. The feeding shaft driving mechanism adjusts the rotation speed of the feeding shaft 11 based on the detection result of the tension detecting mechanism.

The paper feed driving mechanism 121 feeds the printing medium M to the transporting unit 20 at a predetermined transport speed using the feeding shaft driving mechanism and the tension adjustment mechanism 15. The paper feed driving mechanism 121 adjusts the transport speed of the printing medium M based on the detection result of the tension detection mechanism.

The printing unit driving mechanism 123 drives the printing unit 40. The printing unit driving mechanism 123 drives the printing head 41 and the carriage 43. The printing unit driving mechanism 123 drives the printing head 41 to eject the ink onto the printing medium M. The printing unit driving mechanism 123 moves the carriage 43 along the Y-axis. The printing unit driving mechanism 123 causes the printing head 41 to eject the ink while moving the carriage 43. The printing unit driving mechanism 123 causes the printing unit 40 to eject the ink to perform the printing on the printing medium M.

The regulating unit driving mechanism 125 drives the regulating unit 70. The regulating unit driving mechanism 125 drives the regulating member 71. The regulating unit driving mechanism 125 drives the cleaning unit 80. The operation of the regulating unit 70 by the regulating unit driving mechanism 125 will be described later. The regulating unit driving mechanism 125 corresponds to an example of a driving unit.

The printer communication interface 127 is communicatively coupled to an external device such as the drying device 200. The printer communication interface 127 is coupled to the external apparatus in a wired or wireless manner in accordance with a predetermined communication protocol. The printer communication interface 127 receives the print data, print setting conditions, a program, and the like from the external device. The printer communication interface 127 transmits the print setting conditions, a print result, and the like of the printer 100 to the external device. The printer communication interface 127 receives drying conditions such as the medium transport speed transmitted from the drying device 200. The printer communication interface 127 transmits the received drying conditions to the control unit 130.

The control unit 130 is a controller that controls each unit of the printer 100. The control unit 130 includes a control processor such as a central processing unit (CPU), a random access memory (RAM), a read only memory (ROM), and the like. The control unit 130 operates as a functional unit by executing a program by the control processor. The RAM and the ROM function as a work area. The control unit 130 corresponds to an example of a control unit. The control unit 130 controls driving of each of the driving mechanisms based on detection results detected by various sensors.

The control unit 130 includes a printer storage portion 139. The printer storage portion 139 stores various programs such as a control program that operates in the control unit 130, and various data. The printer storage portion 139 stores various types of data such as the print data. The RAM and the ROM may operate as the printer storage portion 139. The printer storage portion 139 may include a magnetic storage device such as a hard disk drive (HDD), a semiconductor memory, or the like.

The control unit 130 functions as a supply control portion 131, a transport control portion 133, a printing control portion 135, and a regulation control portion 137 by executing a control program. The supply control portion 131, the transport control portion 133, the printing control portion 135, and the regulation control portion 137 are functional units. The control unit 130 functions as the functional units to control operations of various units. The control unit 130 controls the operations of various units based on detection results of various sensors such as the encoder 27.

The supply control portion 131 controls the supply of the printing medium M by the supply unit 10. The supply control portion 131 controls the supply of the printing medium M by the paper feed driving mechanism 121. The supply control portion 131 controls the feeding amount of the printing medium M from the roll body R by the feeding shaft driving mechanism, based on the detection result of the tension detection mechanism. The supply control portion 131 adjusts the transport speed of the printing medium M by controlling the tension applied to the printing medium M using the tension adjustment mechanism 15.

The transport control portion 133 controls the transport of the printing medium M by the transporting unit 20. The conveyance control unit 133 controls the moving speed of the medium transporting belt 30 at a time when the medium transporting belt 30 is moved by the belt driving mechanism 25. The transport control portion 133 controls the transport speed of the printing medium M transported by the medium transporting belt 30. The transport control portion 133 controls the transport speed of the printing medium M based on a detection result detected by the encoder 27.

The printing control portion 135 controls the ejection of the ink by the printing unit 40. The printing control portion 135 controls the ejection of the ink to perform the printing on the printing medium M. The printing control portion 135 controls the ejection of the ink based on the print data. The printing control portion 135 controls driving of the printing unit driving mechanism 123. The printing control portion 135 controls an ejection amount and an ejection position of the ink to be ejected from the printing head 41, which is operated by the printing unit driving mechanism 123. The printing control portion 135 controls the movement position along the Y-axis of the carriage 43 that is moved by the printing unit driving mechanism 123, and the like.

The printing control portion 135 may calculate the ejection amount of the ink to be ejected onto the printing surface S1 of the printing medium M, based on the print data. The printing control portion 135 analyzes the print data acquired from the external device or the like. The printing control portion 135 calculates the ejection amount of the ink to be ejected onto the printing surface S1 by analyzing the print data. The ejection amount of the ink is, for example, an ejection amount of ink per unit length of the printing medium M. The unit length of the printing medium M is a predetermined length of the printing medium M along the X-axis. The ejection amount of the ink may be an ejection amount of ink ejected per unit area of the printing surface S1, or the like. The printing control portion 135 calculates the ejection amount of the ink, and stores it in the printer storage portion 139. The ejection amount of the ink corresponds to an example of an ejection amount.

The regulation control portion 137 controls various operations of the regulating unit 70. The regulation control portion 137 controls operations of the regulating member 71 and the cleaning unit 80 included in the regulating unit 70. The regulation control portion 137 controls operations of various members included in the cleaning unit 80. When the cleaning unit 80 includes the cleaning roller 81, the regulation control portion 137 controls rotation, movement, and the like of the cleaning roller 81. The regulation control portion 137 controls various driving operations by the regulating unit driving mechanism 125. The regulation control portion 137 corresponds to an example of the control unit.

The drying device 200 includes the drying belt driving mechanism 221, the medium sensor 215, a drying device communication interface 223, and a drying control portion 230. The drying device 200 includes a heating mechanism that heats the drying unit, a winding driving mechanism that drives a winding unit that takes up the medium, and the like. The heating mechanism and the winding driving mechanism are not illustrated in the drawings.

The drying belt driving mechanism 221 rotationally moves the drying belt 211. The drying belt driving mechanism 221 rotates the transporting roller 213 or the stretching roller, to rotationally move the drying belt 211.

The drying device communication interface 223 is communicatively coupled to a peripheral device such as the printer 100. The drying device communication interface 223 is coupled to the peripheral device in a wired or wireless manner in accordance with a predetermined communication protocol. The drying device communication interface 223 receives information regarding the type of the printing medium M, a program, and the like from the peripheral device. The drying device communication interface 223 transmits the drying conditions such as the medium transport speed to the peripheral device.

The drying control portion 230 is a device control portion that controls each unit of the drying device 200. The drying control portion 230 includes a device control processor such as a CPU, a RAM, a ROM, and the like. The drying control portion 230 operates as a functional unit by executing a program by the device control processor. The RAM and the ROM function as a work area.

The drying control portion 230 includes a device storage portion 235. The device storage portion 235 stores various programs such as a control program that operates in the drying control portion 230, and various data. The device storage portion 235 stores various types of data such as the drying conditions. The RAM and the ROM included in the drying control portion 230 may operate as the device storage portion 235. The device storage portion 235 may include a magnetic storage device such as an HDD, a semiconductor memory, or the like.

The drying control portion 230 functions as a drying control portion 233 by executing the control program. The drying control portion 233 is a functional unit. The drying control portion 230 functions as the functional unit to control operations of various units. The drying control portion 230 controls the operations of various units based on detection results of various sensors such as the medium sensor 215.

The drying control portion 233 controls driving of the drying belt driving mechanism 221. The drying control portion 233 controls the medium transport speed of the printing medium M at a time when the printing medium M is transported by the drying belt driving mechanism 221. The drying control portion 233 controls the medium transport speed based on the detection result of the medium sensor 215. The drying control portion 233 calculates a speed difference between the transport speed of the printer 100 and the medium transport speed of the drying device 200 based on the detection result of the medium sensor 215. The transport speed of the printer 100 is the transport speed of the printing medium M by the transporting unit 20. The medium transport speed of the drying device 200 is the medium transport speed of the printing medium M by the drying belt 211. The drying control portion 233 controls the medium transport speed by the drying belt 211 so that the speed difference is equal to or less than a predetermined value.

Figure 8:
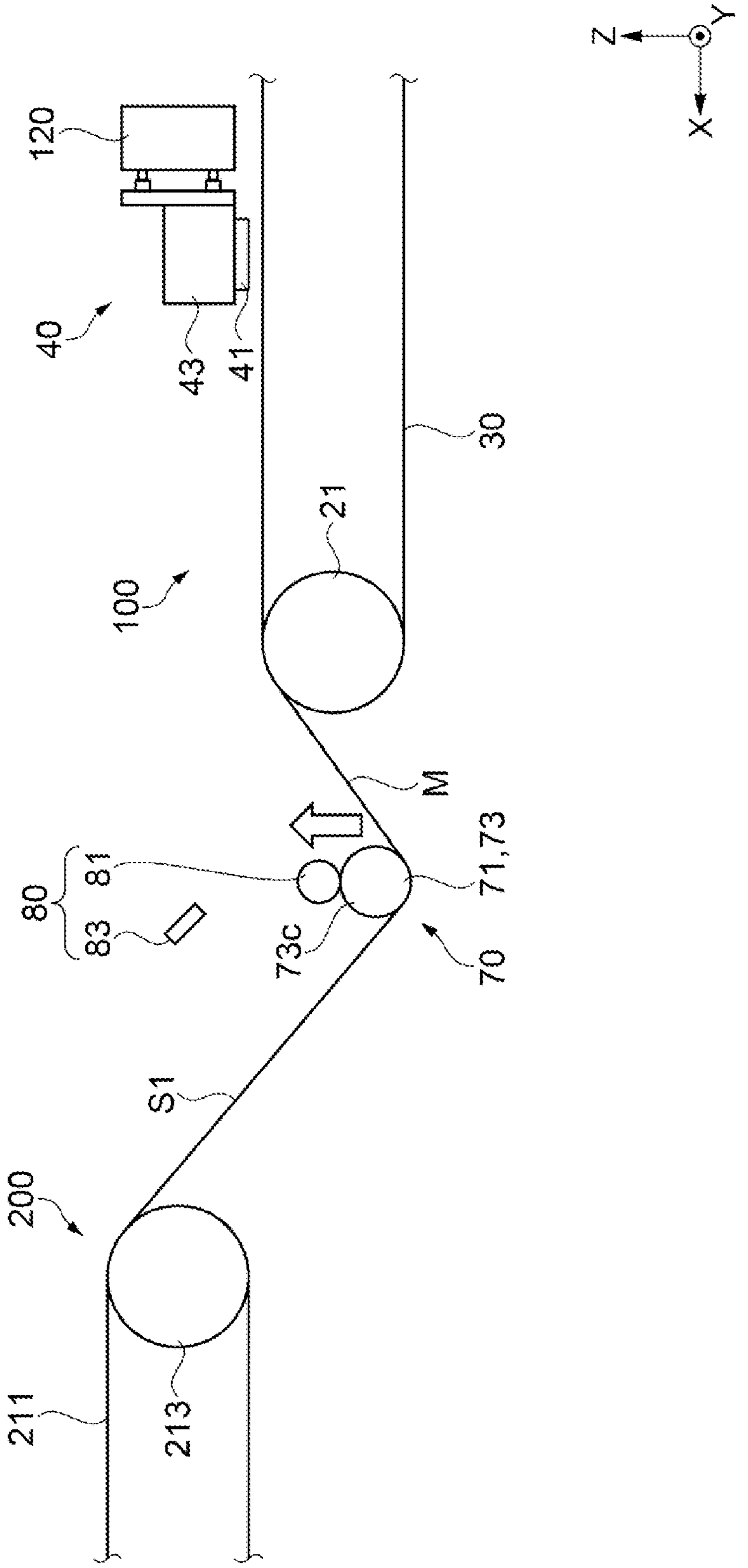
FIG. 8 is a diagram illustrating a schematic configuration of a regulating unit.

FIG. 8 illustrates a schematic configuration of the regulating unit 70. FIG. 8 illustrates a first configuration example of the regulating unit 70. The regulating member 71 illustrated in FIG. 8 is the regulating roller 73. The cleaning unit 80 illustrated in FIG. 8 includes the cleaning roller 81 and an application member 83.

The regulating roller 73 comes into contact with the printing surface S1 of the printing medium M at the regulating roller surface 73*c*. The regulating roller 73 is rotated by the movement of the printing medium M. The regulating roller 73 corresponds to an example of a rotating body. The regulating roller surface 73*c* corresponds to an example of an outer circumferential surface. The regulating roller 73 moves in the +Z direction or the −Z direction along the guide portion 92 provided at the regulating member support portion 91.

The cleaning roller 81 cleans the regulating roller surface 73*c* of the regulating roller 73. The cleaning roller 81 comes into contact with the regulating roller surface 73*c* of the regulating roller 73, and applies the cleaning liquid to the regulating roller 73. The cleaning roller 81 is rotated by the rotation of the regulating roller 73. By the cleaning roller 81 being rotated by the rotation of the regulating roller 73, the cleaning roller 81 cleans the regulating roller surface 73*c* of the regulating roller 73. The cleaning roller 81 corresponds to an example of the cleaning member.

The regulating roller 73 and the cleaning roller 81 illustrated in FIG. 8 are unitized. The cleaning roller 81 moves in the +Z direction or the −Z direction integrally with the regulating roller 73 in accordance with the movement of the regulating roller 73 along the guide portion 92. When the regulating roller 73 is positioned at the upper limit position of the guide portion 92, the cleaning roller 81 faces the application member 83.

The application member 83 applies the cleaning liquid to the cleaning roller 81. The cleaning liquid is water, a water-soluble solvent such as an alcohol aqueous solution, or the like. The cleaning liquid may contain a surfactant, an anti-foaming agent, or the like. The cleaning liquid may be the same as the cleansing liquid used in the cleansing unit 50. The application member 83 supplies the cleaning liquid to the cleaning roller 81 by spraying the cleaning liquid to the cleaning roller 81. The application member 83 applies the cleaning liquid to the cleaning roller 81 when the cleaning roller 81 has moved up to a position facing the application member 83. The application member 83 is fixed to the printer 100.

The printer 100 may include a storage unit (not illustrated) that stores the cleaning liquid. The printer 100 may include a plurality of the storage units. In this case, the printer 100 may include a plurality of the application members 83 corresponding to the plurality of storage units. Each of the plurality of application members 83 is directly or indirectly coupled to each of the plurality of storage units such that the cleaning liquid can flow therethrough When each of the plurality of application members 83 is indirectly coupled to each of the plurality of storage units, a known member such as a tube or a valve may be used for the coupling. In addition, the plurality of storage units may store different types of the cleaning liquid, respectively. In this way, the different types of the cleaning liquid can be sprayed from the plurality of application members 83 to the cleaning roller 81.

The control unit 130 may further include an application control unit as a functional unit. The application control unit controls the operation of the application member 83. The application control unit may change the type of the cleaning liquid applied to the cleaning roller 81 based on the type of the ink. Specifically, the application control unit controls turning on/off of the application member 83 as an example of the operation of the application member 83, or controls opening and closing of a valve, thereby selecting, in accordance with the type of the ink, the application member 83 capable of spraying the optimum cleaning liquid among the plurality of application members 83. For example, when the type of the ink is pigment, the application member 83 capable of spraying the alcohol aqueous solution is operated among the plurality of application members 83, and when the type of the ink is dye, the application member 83 capable of spraying water is operated among the plurality of application members 83. The type of ink may be input by the user via a touch panel (not illustrated) electrically coupled to the control unit 130, for example. The touch panel is an example of an operation unit that can be operated by the user.

Note that the printer 100 may include the single application member 83 corresponding to the plurality of storage units. In this case, for example, a plurality of electromagnetic valves may be provided in a plurality of flow paths, of the cleaning liquid, from the plurality of storage units to the single application member 83, and the application control unit may switch the plurality of electromagnetic valves so that the selected cleaning liquid is supplied to the single application member 83.

The regulating member 71 is the regulating roller 73 that has the regulating roller surface 73*c* that comes into contact with the printing surface S1 and follows the movement of the printing medium M, and the cleaning unit 80 includes the cleaning roller 81 that cleans the regulating roller surface

73*c* by coming into contact with the regulating roller surface 73*c* of the regulating roller 73.

The cleaning roller 81 can clean the regulating roller surface 73*c* of the regulating roller 73 when the regulating roller 73 regulates the movement position of the printing medium M.

Figure 9:
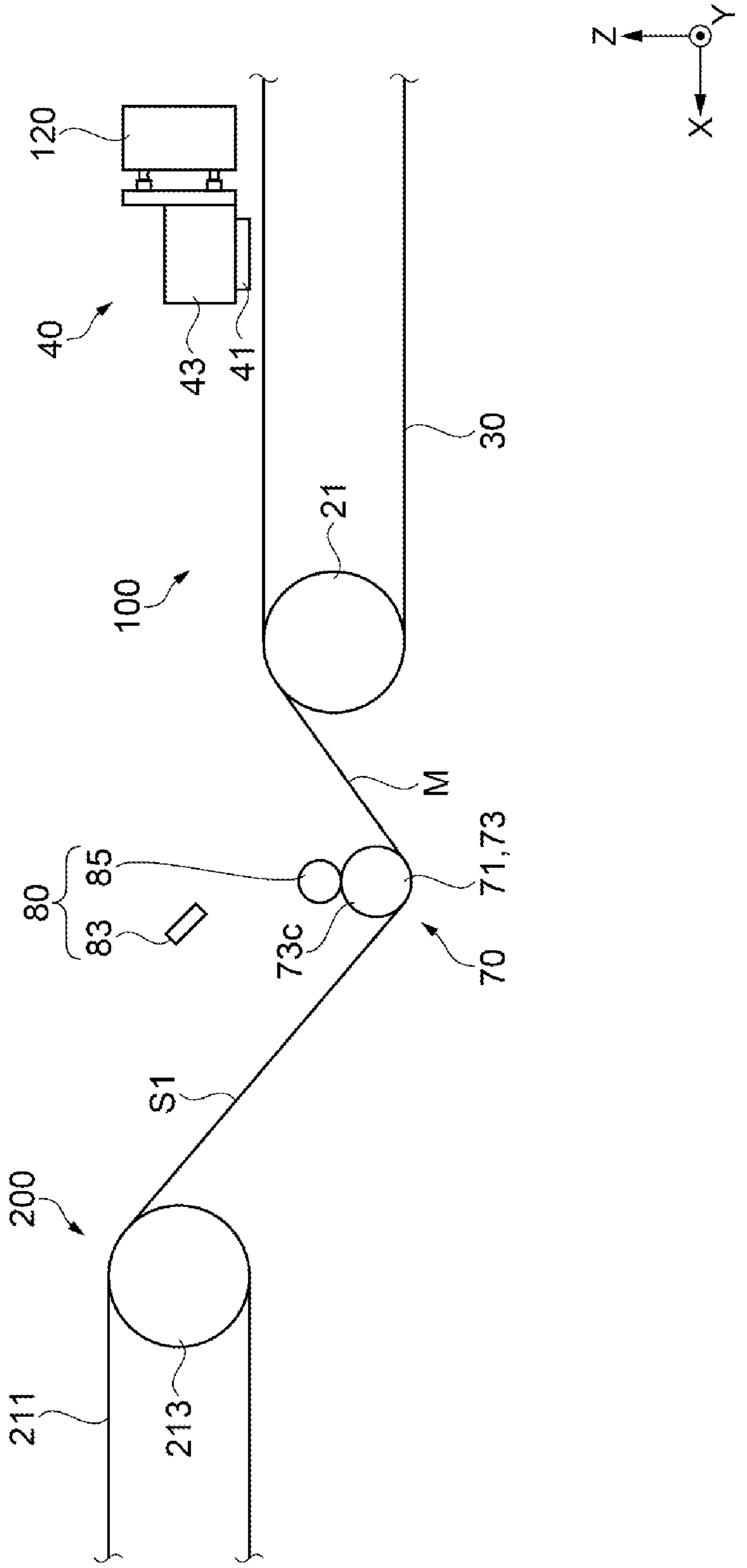
FIG. 9 is a diagram illustrating a state in which a cleaning brush is in contact with the regulating roller.
Figure 10:
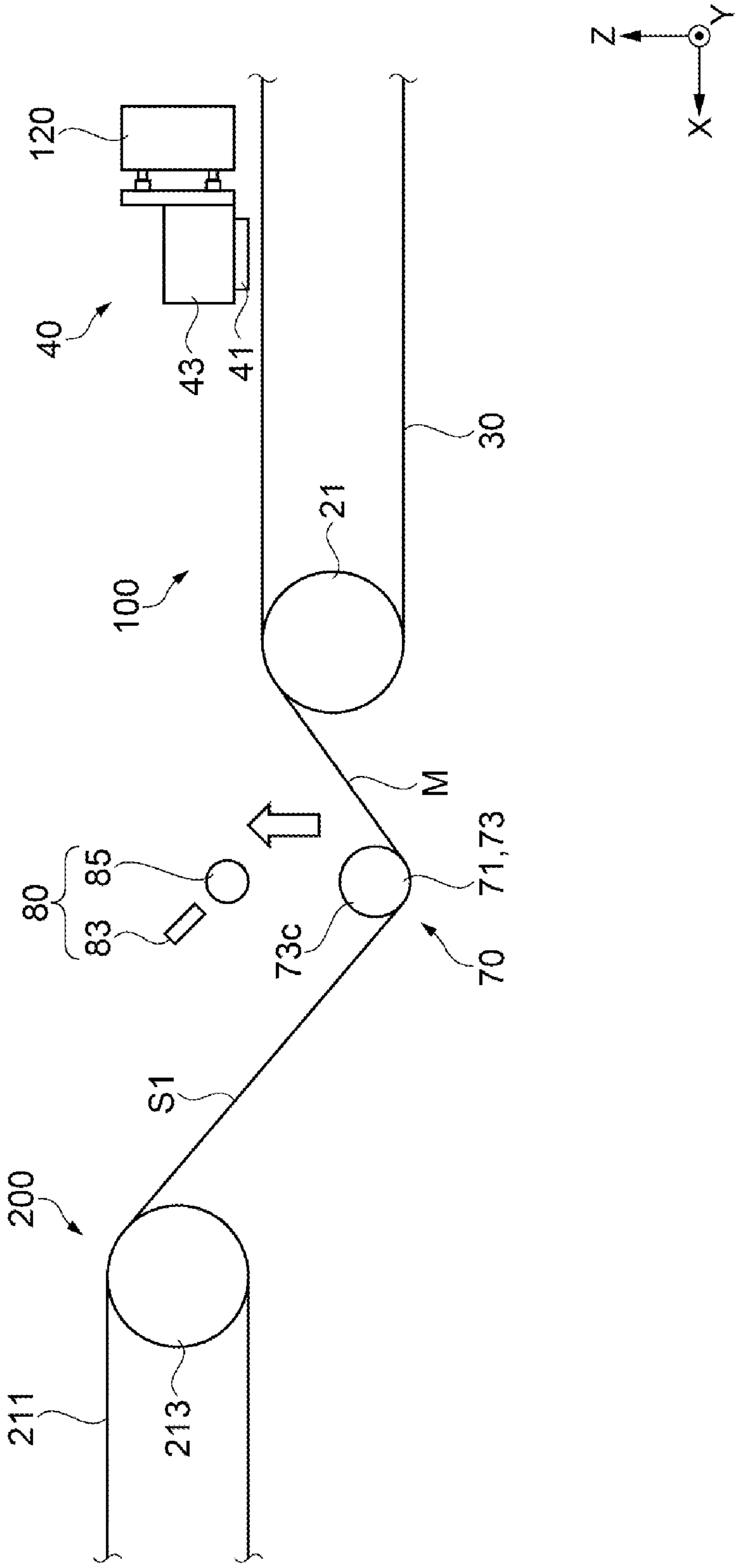
FIG. 10 is a diagram illustrating a state in which the cleaning brush is moving away from the regulating roller.

FIGS. 9 and 10 illustrate a schematic configuration of the regulating unit 70. FIGS. 9 and 10 illustrate a second configuration example of the regulating unit 70. The regulating member 71 illustrated in FIGS. 9 and 10 is the regulating roller 73. The cleaning unit 80 illustrated in FIGS. 9 and 10 includes the application member 83 and a cleaning brush 85.

FIG. 9 illustrates a state in which the cleaning brush 85 is in contact with the regulating roller 73. FIG. 9 illustrates a relationship between the regulating roller 73, the cleaning brush 85, and the application member 83.

The regulating roller 73 comes into contact with the printing surface S1 of the printing medium M at the regulating roller surface 73*c*. The regulating roller 73 is rotated by the movement of the printing medium M. The regulating roller 73 moves in the +Z direction or the −Z direction along the guide portion 92 provided at the regulating member support portion 91.

The cleaning brush 85 cleans the regulating roller surface 73*c* of the regulating roller 73. The cleaning brush 85 comes into contact with the regulating roller surface 73*c* of the regulating roller 73 and applies the cleaning liquid thereto. The cleaning brush 85 is rotated by the regulating unit driving mechanism 125. When the cleaning brush 85 is located at a position in contact with the regulating roller surface 73*c* of the regulating roller 73, the cleaning brush 85 can be rotated by the regulating unit driving mechanism 125. The regulating unit driving mechanism 125 rotationally drives the cleaning brush 85. The cleaning brush 85 clean the regulating roller surface 73*c* of the regulating roller 73 by rotating in a predetermined direction. The cleaning brush 85 corresponds to an example of the cleaning member. The regulating unit driving mechanism 125 corresponds to an example of a driving unit.

FIG. 10 illustrates a state in which the cleaning brush 85 is moving away from the regulating roller 73. FIG. 10 illustrates a relationship between the regulating roller 73, the cleaning brush 85, and the application member 83.

The application member 83 applies the cleaning liquid to the cleaning brush 85. The application member 83 supplies the cleaning liquid to the cleaning brush 85 by spraying the cleaning liquid to the cleaning brush 85. The application member 83 is fixed to the printer 100.

The cleaning brush 85 is configured to be movable along the Z-axis. The cleaning brush 85 is moved in the +Z direction or the −Z direction by the regulating unit driving mechanism 125. The cleaning brush 85 illustrated in FIG. 10 is moving in the +Z direction. The cleaning brush 85 faces the application member 83 by moving in the +Z direction. When the cleaning brush 85 moves to a position facing the application member 83, the cleaning liquid is supplied from the application member 83 to the cleaning brush 85.

The printer 100 includes the regulating unit driving mechanism 125 that rotationally drives the cleaning brush 85, and the cleaning brush 85 rotationally driven by the regulating unit driving mechanism 125 cleans the regulating roller surface 73*c* by coming into contact with the regulating roller surface 73*c*. The cleaning performance of the cleaning brush 85 with respect to the regulating roller 73 is improved as a result of the cleaning brush 85 being rotationally driven.

Figure 11:
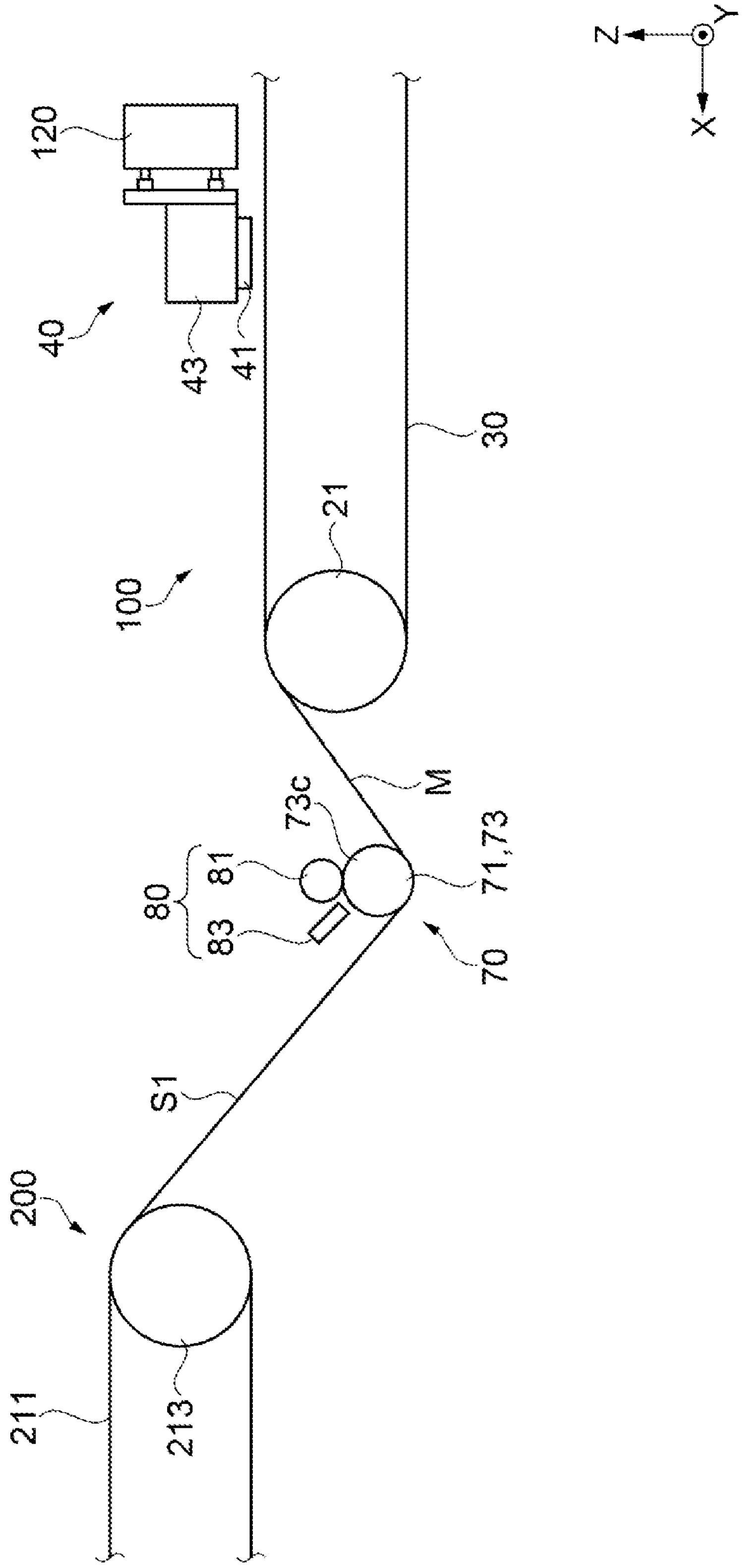
FIG. 11 is a diagram illustrating a schematic configuration of the regulating unit.

FIG. 11 illustrates a schematic configuration of the regulating unit 70. FIG. 11 illustrates a third configuration example of the regulating unit 70. The regulating member 71 illustrated in FIG. 11 is the regulating roller 73. The cleaning unit 80 illustrated in FIG. 11 includes the cleaning roller 81 and the application member 83.

The regulating roller 73 comes into contact with the printing surface S1 of the printing medium M at the regulating roller surface 73*c*. The regulating roller 73 is rotated by the movement of the printing medium M. The regulating roller 73 moves in the +Z direction or the −Z direction along the guide portion 92 provided at the regulating member support portion 91.

The cleaning roller 81 cleans the regulating roller surface 73*c* of the regulating roller 73. The cleaning roller 81 comes into contact with the regulating roller surface 73*c* of the regulating roller 73, and applies the cleaning liquid thereto. The cleaning roller 81 is rotationally driven by the regulating unit driving mechanism 125. The cleaning roller 81 cleans the regulating roller surface 73*c* of the regulating roller 73 by rotating in a predetermined direction.

The application member 83 applies the cleaning liquid to the regulating roller surface 73*c* of the regulating roller 73. The application member 83 supplies the cleaning liquid to the regulating roller surface 73*c* of the regulating roller 73 by spraying the cleaning liquid to the regulating roller surface 73*c* of the regulating roller 73.

The regulating roller 73, the cleaning roller 81, and the application member 83 illustrated in FIG. 11 are unitized. The cleaning roller 81 and the application member 83 move in the +Z direction or the −Z direction integrally with the regulating roller 73, in accordance with the movement of the regulating roller 73 along the guide portion 92. The regulating roller 73, the cleaning roller 81, and the application member 83 may be integrally configured so as be detachable from the printer 100.

With the regulation unit driving mechanism 125, the rotational driving of the cleaning roller 81 may be adjusted by the regulation control portion 137. As an example, the regulation control portion 137 adjusts the number of rotations of the cleaning roller 81. The number of rotations of the cleaning roller 81 is the number of rotations per unit time. The regulation control portion 137 reads the ejection amount of the ink stored in the printer storage portion 139. The regulation control portion 137 adjusts the number of rotations of the cleaning roller 81 based on the read ejection amount of the ink.

As an example, when the read ejection amount of the ink is larger than a predetermined reference ink amount, the regulation control portion 137 increases the number of rotations of the cleaning roller 81. When the ejection amount of the ink is larger than the reference ink amount, an amount of the ink adhering to the regulating roller surface 73*c* of the regulating roller 73 tends to increase. The regulation control portion 137 reduces the amount of the ink adhering to the regulating roller surface 73*c* of the regulating roller 73 by increasing the number of rotations of the cleaning roller 81. The deterioration in the image quality due to an increase in the amount of the adhering ink is suppressed. When the read ejection amount of the ink is smaller than the predetermined reference ink amount, the number of rotations of the cleaning roller 81 is decreased. When the ejection amount of the ink is smaller than the reference ink amount, the amount of the ink adhering to the regulating roller surface 73*c* of the regulating roller 73 tends to decrease. When the amount of the ink adhering to the regulating roller surface 73*c* of the regulating roller 73 is reduced, the cleaning roller 81 becomes a rotational resistance with respect to the regulating roller 73. When the cleaning roller 81 and the regulating roller surface 73*c* of the regulating roller 73 slide against each other, due to the rotational resistance, it becomes difficult for the regulating roller 73 to be smoothly rotated by the movement of the printing medium M. As a result, there is a possibility that the regulating roller 73 slides against the printing surface S1 and the image quality deteriorates. The regulation control portion 137 maintains the amount of the ink adhering to the regulating roller surface 73*c* of the regulating roller 73 by reducing the number of rotations of the cleaning roller 81. The deterioration in the image quality of the image printed on the printing surface S1 of the printing medium M is suppressed.

The printer 100 includes the regulation control portion 137 that controls the regulation unit driving mechanism 125, and the regulation control portion 137 adjusts the number of rotations of the cleaning roller 81 based on the ejection amount of the ink to be ejected from the printing unit 40.

By adjusting the number of rotations of the cleaning roller 81 in accordance with the ejection amount of the ink, the deterioration in the image quality of the image printed on the printing medium M is suppressed.

Note that the regulation control portion 137 may adjust the number of rotations of the cleaning roller 81 based on the type of the ink to be ejected from the printing unit 40.

Figure 12:
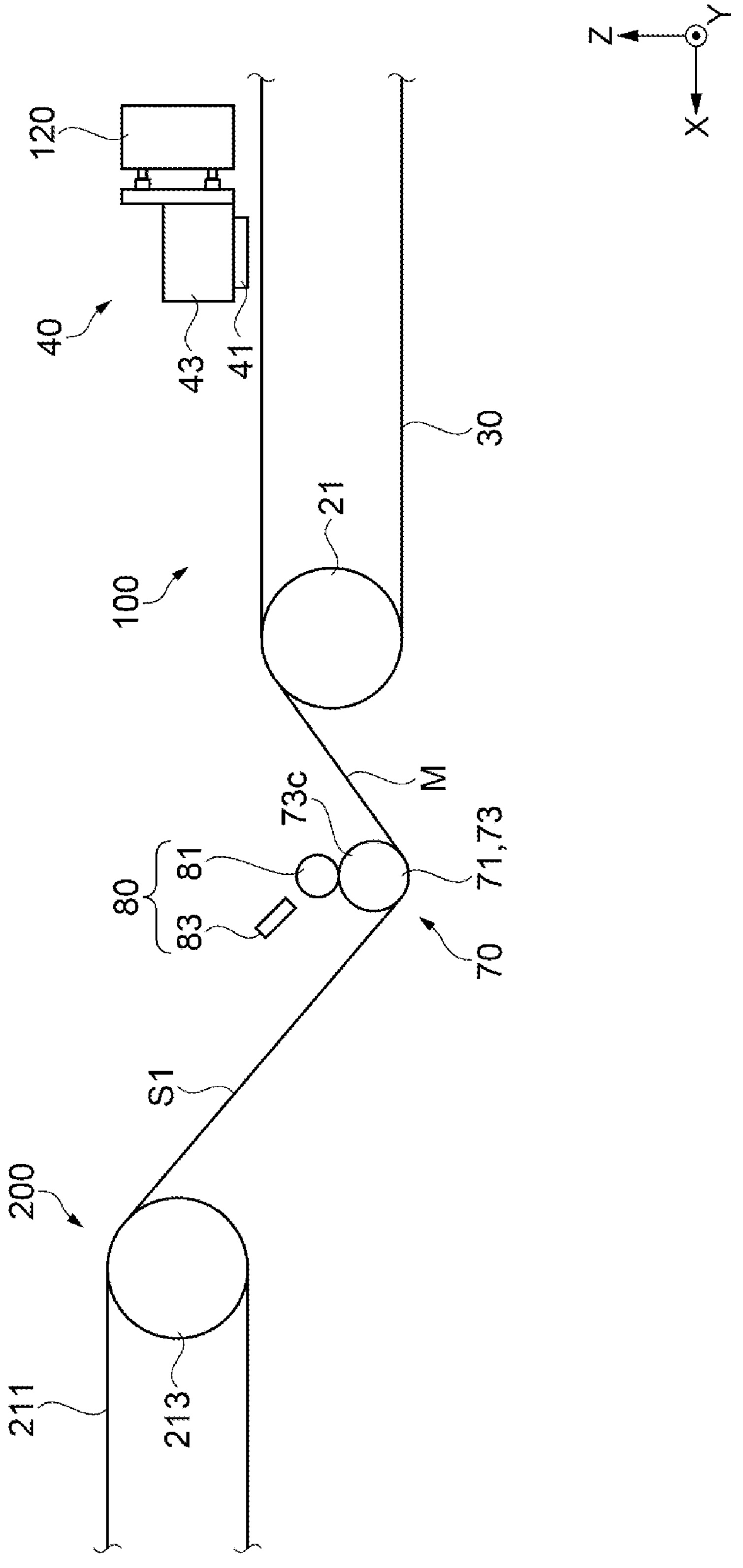
FIG. 12 is a diagram illustrating a state in which a cleaning unit is in contact with the regulating roller.
Figure 13:
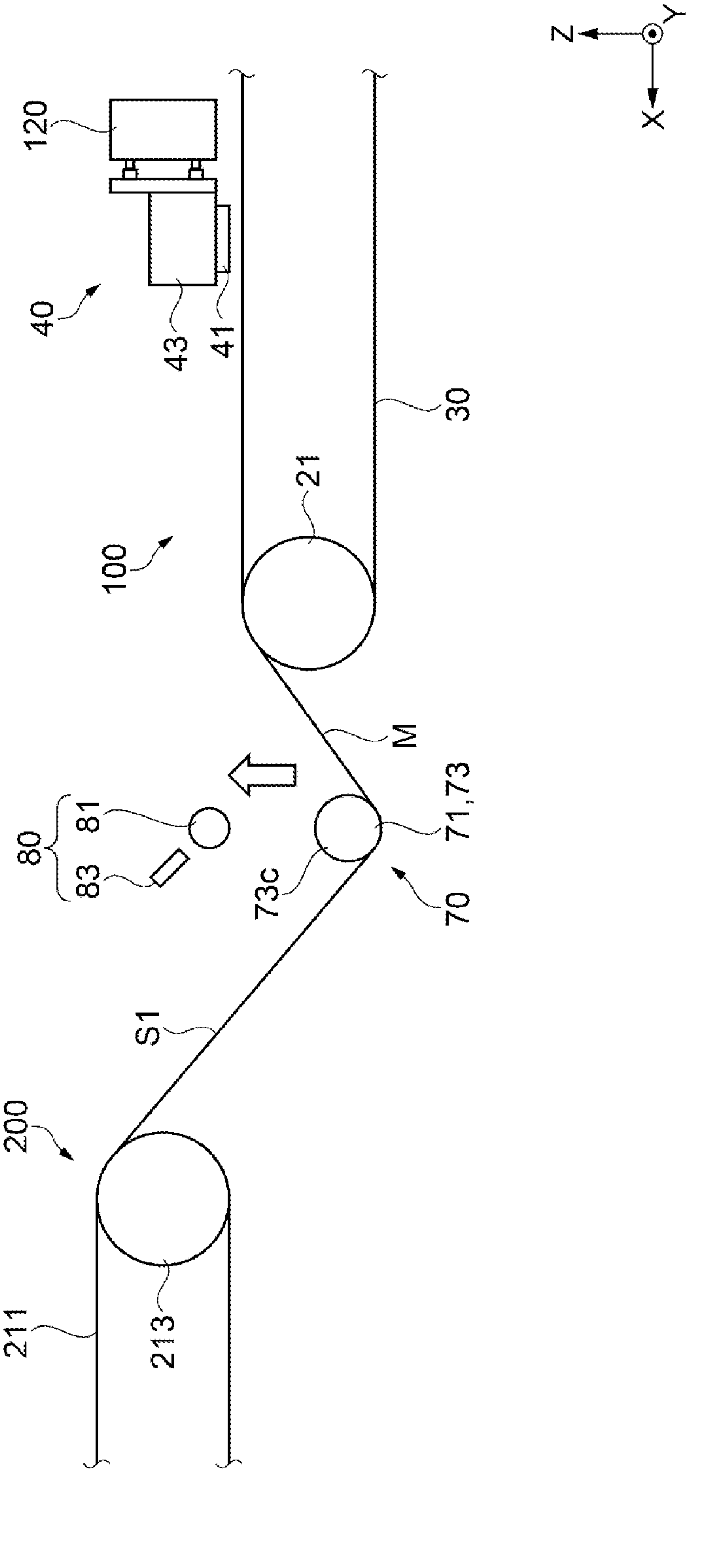
FIG. 13 is a diagram illustrating a state in which the cleaning unit is moving away from the regulating roller.

FIGS. 12 and 13 illustrate a schematic configuration of the regulating unit 70. FIGS. 12 and 13 illustrate a fourth configuration example of the regulating unit 70. The regulating member 71 illustrated in FIGS. 12 and 13 is the regulating roller 73. The cleaning unit 80 illustrated in FIGS. 12 and 13 includes the cleaning roller 81 and the application member 83. The cleaning roller 81 and the application member 83 are integrally configured.

FIG. 12 illustrates a state in which the cleaning unit 80 is in contact with the regulating roller 73. FIG. 12 illustrates a relationship between the regulating roller 73, the cleaning roller 81, and the application member 83.

The regulating roller 73 comes into contact with the printing surface S1 of the printing medium M at the regulating roller surface 73*c*. The regulating roller 73 is rotated by the movement of the printing medium M. The regulating roller 73 moves in the +Z direction or the −Z direction along the guide portion 92 provided at the regulating member support portion 91.

The cleaning roller 81 cleans the regulating roller surface 73*c* of the regulating roller 73. The cleaning roller 81 comes into contact with the regulating roller surface 73*c* of the regulating roller 73, and applies the cleaning liquid thereto. The cleaning roller 81 is rotated by the rotation of the regulating roller 73. By the cleaning roller 81 being rotated by the rotation of the regulating roller 73, the cleaning roller 81 cleans the regulating roller surface 73*c* of the regulating roller 73.

The application member 83 applies the cleaning liquid to the cleaning roller 81. The application member 83 supplies the cleaning liquid to the cleaning roller 81 by spraying the cleaning liquid to the cleaning roller 81.

FIG. 13 illustrates a state in which the cleaning unit 80 is moving away from the regulating roller 73. FIG. 13 illustrates a relationship between the regulating roller 73, and the cleaning unit 80 including the cleaning roller 81 and the application member 83.

The cleaning unit 80 is configured to be movable along the Z-axis. The cleaning unit 80 is moved in the +Z direction or the −Z direction by the regulating unit driving mechanism 125. The cleaning unit 80 illustrated in FIG. 13 is moving in the +Z direction. When the cleaning unit 80 moves in the +Z direction, the cleaning roller 81 moves away from the regulating roller 73. The cleaning roller 81 and the application member 83 integrally move along the Z-axis. The cleaning unit 80 may be unitized so as to detachable from the printer 100.

FIGS. 8, 9, 10, 11, 12, and 13 illustrate the regulating roller 73 as the regulating member 71, but the regulating member 71 is not limited to this example. The regulating member 71 may be constituted by a fixing rod or the like. FIGS. 8, 9, 10, 11, 12, and 13 illustrate the cleaning roller 81 or the cleaning brush 85 in contact with the regulating roller 73, but the configuration is not limited to these examples. The cleaning unit 80 may include an air brush or the like that blows air against the regulating member 71. The air brush cleans the regulating member 71 in a non-contact state with respect to the regulating member 71.

Figure 14:
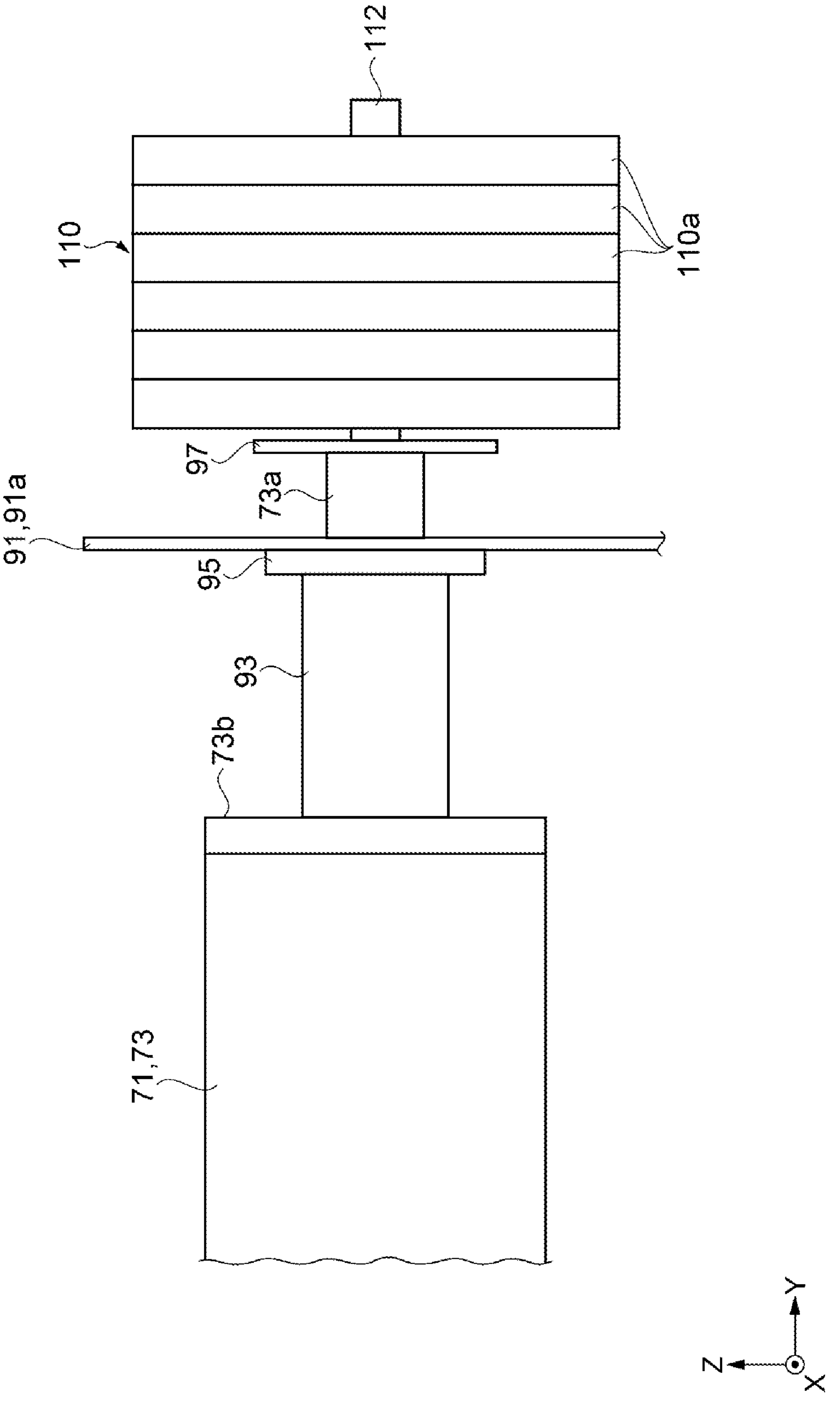
FIG. 14 is a diagram illustrating a support structure of the regulating member including a weight.
Figure 15:
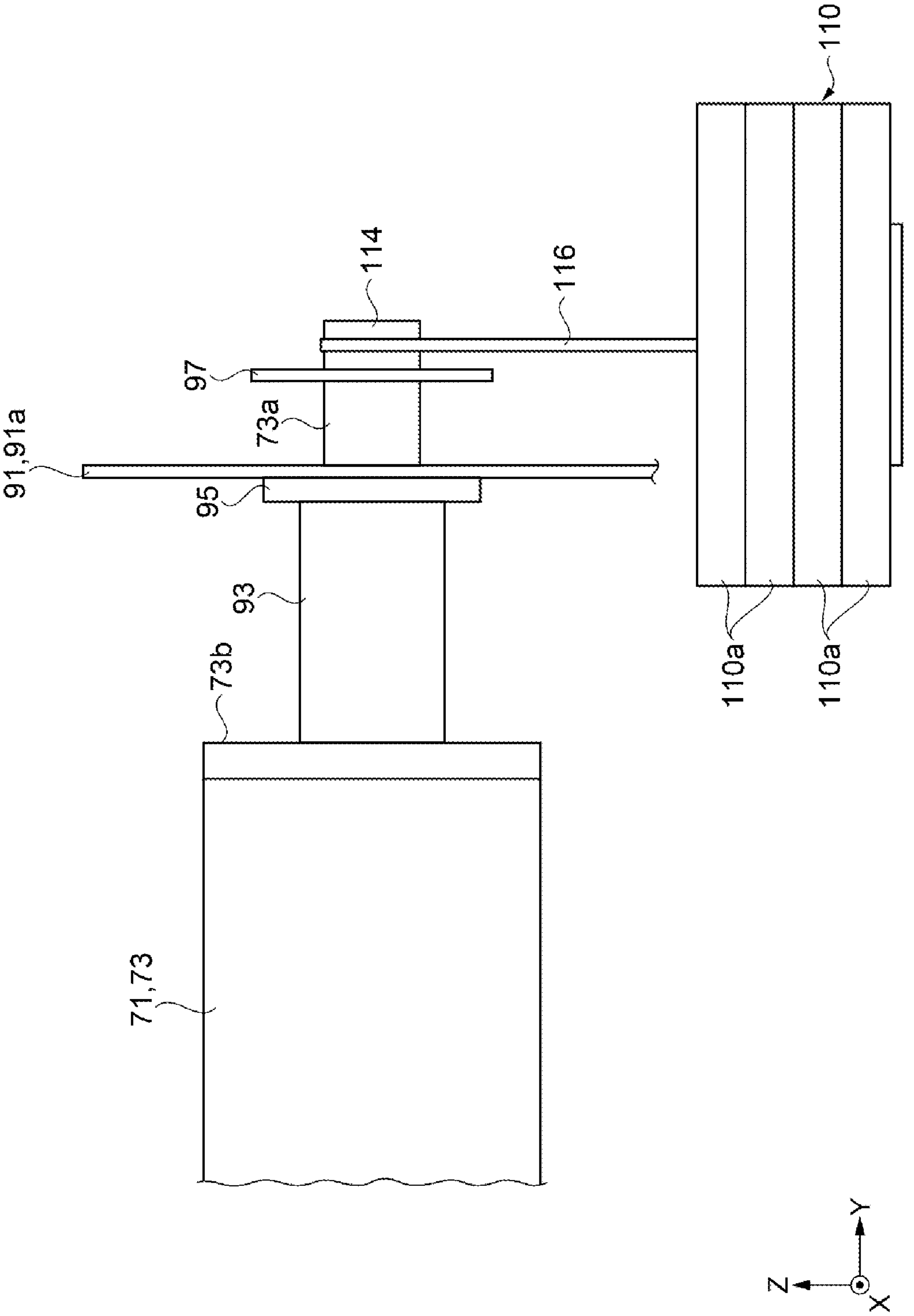
FIG. 15 is a diagram illustrating a support structure of the regulating member including the weight.

A load may be applied to the restricting member 71 by the weight 110. FIGS. 14 and 15 illustrate a configuration in which the weight 110 applies a load to the regulating member 71. FIGS. 14 and 15 illustrate a peripheral configuration of the regulating roller shaft 73*a* of the regulating roller 73, which is an example of the regulating member 71. Although FIGS. 14 and 15 illustrate a peripheral configuration of the first support member 91*a*, a peripheral configuration of the second support member 91*b* may be the configuration illustrated in FIGS. 14 and 15.

FIG. 14 illustrates a support structure of the regulating member 71 including the weight 110. The weight 110 illustrated in FIG. 14 is provided at a shaft end portion of the regulating roller shaft 73*a*. FIG. 14 illustrates the weight 110 and a shaft 112 as members added to the regulating roller shaft 73*a*.

The weight 110 applies a load to the regulating roller 73. When the regulating roller 73 comes into contact with the printing medium M, the regulating roller 73 applies its own weight to the printing medium M. The weight 110 applies a load to the printing medium M to which the regulating roller 73 applies its own weight. The weight 110 applies a load to the printing medium M. The weight 110 is constituted by a plurality of plate-shaped members 110*a*. The plate-shaped member 110*a* is detachable by the user. The user can adjust the load applied to the printing medium M by adjusting the number of the plate members 110*a* constituting the weight 110.

The shaft 112 supports the weight 110. The shaft 112 is provided at a position in the +Y direction of the regulating roller shaft 73*a*. The shaft 112 detachably supports the plate-shaped members 110*a*. The shaft 112 may be configured to be detachable from the regulating roller shaft 73*a*.

FIG. 15 illustrates a support structure of the regulating member 71 including the weight 110. The weight 110 illustrated in FIG. 15 is supported by a support structure different from that illustrated in FIG. 14. FIG. 15 illustrates the weight 110, a bearing 114, and a weight support member 116 as members added to the regulating roller shaft 73*a*.

Similarly to the weight 110 illustrated in FIG. 14, the weight 110 illustrated in FIG. 15 is constituted by the plurality of plate-shaped members 110*a*. The plate-shaped member 110*a* is detachable by the user. The weight 110 is supported by the weight support member 116.

The bearing 114 supports the weight 110. The bearing 114 is provided at the regulating roller shaft 73*a*. The bearing 114 supports one end of the weight support member 116. The bearing 114 may detachably support the weight support member 116.

The weight support member 116 supports the weight 110. One end of the weight support member 116 is supported by the bearing 114. The weight support member 116 is suspended from the bearing 114. The weight support member 116 detachably supports the plate-shaped members 110*a*.

By adopting a configuration in which the weight 110 is added to the regulating member 71, it is possible to adjust the load applied to the printing medium M. The user can adjust the load applied to the printing medium M in accordance with the type, size, or the like of the printing medium M.

What is claimed is:

1. A liquid ejecting device comprising:

a transporting belt having a support surface configured to support a medium, the transporting belt being configured to transport the medium in a first direction;

an ejecting unit configured to eject a liquid onto a first surface of the medium transported by the transporting belt;

a regulating unit configured to come into contact with the first surface of the medium to which the liquid is ejected by the ejecting unit, and configured to regulate upward movement of the medium, the regulating unit comprising a regulating member that is configured to rotate about and move along an axis, the axis intersecting the first direction and extending along the support surface; and a cleaning unit configured to clean the regulating unit.

2. The liquid ejecting device according to claim 1, wherein the regulating unit has an outer circumferential surface configured to come into contact with the first surface, the regulating unit being a rotating body driven in accordance with movement of the medium, and the cleaning unit includes a cleaning member configured to come into contact with the outer circumferential surface of the regulating unit to clean the outer circumferential surface.

3. The liquid ejecting device according to claim 2, comprising a driving unit configured to rotationally drive the cleaning member, wherein the cleaning member rotationally driven by the driving unit comes into contact with the outer circumferential surface to clean the outer circumferential surface.

4. The liquid ejecting device according to claim 3, comprising a control unit configured to control the driving unit, wherein the control unit adjusts a number of rotations of the cleaning member based on an ejection amount of the liquid ejected from the ejecting unit.

5. The liquid ejecting device according to claim 1, wherein the cleaning unit includes an application member configured to apply a cleaning liquid to the regulating unit, a control unit configured to control operation of the application member is provided, and the control unit changes a type of the cleaning liquid based on a type of the liquid ejected from the ejecting unit.

6. The liquid ejecting device according to claim 1, comprising:

a support member configured to support an end portion, in an axial direction, of the regulating unit; and an elastic member facing the support member and configured to press the regulating unit along the axis.

* * * * *